United States Patent
Yamada et al.

(10) Patent No.: US 11,611,147 B2
(45) Date of Patent: *Mar. 21, 2023

(54) ANTENNA MODULE, COMMUNICATION DEVICE EQUIPPED WITH THE SAME, AND MANUFACTURING METHOD OF ANTENNA MODULE

(71) Applicant: Murata Manufacturing Co., Ltd., Kyoto (JP)

(72) Inventors: Yoshiki Yamada, Kyoto (JP); Michiharu Yokoyama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,592

(22) Filed: Jul. 30, 2021

(65) Prior Publication Data

US 2021/0359416 A1 Nov. 18, 2021

Related U.S. Application Data

(63) Continuation of application No. 17/021,069, filed on Sep. 15, 2020, now Pat. No. 11,108,157, which is a
(Continued)

(30) Foreign Application Priority Data

Feb. 20, 2019 (JP) .............................. JP2019-027976
Oct. 17, 2019 (JP) .............................. JP2019-190354

(51) Int. Cl.
*H01Q 21/06* (2006.01)
*H01Q 1/24* (2006.01)
(Continued)

(52) U.S. Cl.
CPC .......... *H01Q 9/0414* (2013.01); *H01Q 1/243* (2013.01); *H04B 1/04* (2013.01); *H04B 2001/0408* (2013.01)

(58) Field of Classification Search
None
See application file for complete search history.

(56) References Cited

U.S. PATENT DOCUMENTS 8,098,203 B2 1/2012 Ueki
8,125,390 B2 2/2012 Kuramoto et al.
(Continued)

FOREIGN PATENT DOCUMENTS

JP 2008-113187 A 5/2008
JP 2014-110617 A 6/2014
(Continued)

OTHER PUBLICATIONS

International Search Report for PCT/JP2020/002731 dated Apr. 7, 2020.
Written Opinion for PCT/JP2020/002731 dated Apr. 7, 2020.

*Primary Examiner* — Pablo N Tran
(74) *Attorney, Agent, or Firm* — Pearne & Gordon LLP

(57) ABSTRACT

An antenna module includes a dielectric substrate and a radiation element disposed on the dielectric substrate. The dielectric substrate includes a flat portion (131) and a flat portion (130) having mutually different normal directions, and a bent portion connecting the flat portion (131) and the flat portion (130) to each other. The flat portion (131) has a protruding portion partially protruding in a direction toward the flat portion (130) along the flat portion (131) from a boundary portion between the bent portion and the flat portion (131). The flat portion (131) and the bent portion are connected to each other at a position where the protruding portion is not provided in the flat portion (131). At least a
(Continued)

part of the radiation element is disposed on the protruding portion.

20 Claims, 28 Drawing Sheets

Related U.S. Application Data continuation of application No. PCT/JP2020/002731, filed on Jan. 27, 2020.

(51) Int. Cl.
*H01Q 9/04* (2006.01)
*H04B 1/04* (2006.01)

(56) References Cited

U.S. PATENT DOCUMENTS

| | | | |
|---|---|---|---|
| 8,207,895 | B2 | 6/2012 | Wong et al. |
| 10,122,058 | B2 | 11/2018 | Oguri et al. |
| 10,224,596 | B2 | 3/2019 | Orihara |
| 10,270,174 | B2 | 4/2019 | Pauloto et al. |
| 10,468,763 | B2 | 11/2019 | Yokoyama et al. |
| 2009/0303133 | A1* | 12/2009 | Ueki ............ H01Q 9/0421 343/700 MS |
| 2010/0231477 | A1* | 9/2010 | Kuramoto ............ H01Q 9/285 343/822 |
| 2013/0292050 | A1* | 11/2013 | Chiou ............ H05K 3/4691 156/252 |
| 2017/0279177 | A1 | 9/2017 | Oguri et al. |
| 2018/0151941 | A1 | 5/2018 | Orihara |
| 2018/0205155 | A1 | 7/2018 | Mizunuma et al. |
| 2020/0119453 | A1 | 4/2020 | Takayama et al. |
| 2020/0381843 | A1 | 12/2020 | Murata et al. |
| 2020/0388926 | A1 | 12/2020 | Maruyama et al. |
| 2021/0013621 | A1* | 1/2021 | Nakamoto ......... H01Q 21/0062 |
| 2021/0296750 | A1* | 9/2021 | Chaki ............ H05K 1/0253 |
| 2022/0006178 | A1* | 1/2022 | Shimura ............ H01Q 1/42 |
| 2022/0066281 | A1* | 3/2022 | Ozaki ............ G02F 1/2255 |

FOREIGN PATENT DOCUMENTS

| | | |
|---|---|---|
| JP | 2016-015636 A | 1/2016 |
| JP | 2016-225796 A | 12/2016 |
| JP | 6168258 B1 | 7/2017 |
| JP | 6419469 B2 | 10/2018 |
| JP | 2019-004241 A | 1/2019 |
| WO | 2018/230475 A1 | 12/2018 |

* cited by examiner

ANTENNA MODULE, COMMUNICATION DEVICE EQUIPPED WITH THE SAME, AND MANUFACTURING METHOD OF ANTENNA MODULE

CROSS REFERENCE TO RELATED APPLICATION

This is a continuation of U.S. application Ser. No. 17/021,069 filed on Sep. 15, 2020, which is a continuation of International Application No. PCT/JP2020/002731 filed on Jan. 27, 2020 which claims priority from Japanese Patent Application No. 2019-027976 filed on Feb. 20, 2019 and Japanese Patent Application No. 2019-190354 filed on Oct. 17, 2019. The contents of these applications are incorporated herein by reference in their entireties.

BACKGROUND

Technical Field

The present disclosure relates to an antenna module and a communication device equipped with the same, and a manufacturing method of an antenna module, and more specifically, relates to a technique for miniaturizing an antenna module.

As an antenna element (radiation element) of a mobile terminal (communication device), such as a smartphone, a patch antenna having a flat plate shape may be used in some cases. Since radio waves radiated by the patch antenna have high directivity (rectilinear propagation characteristics), in order to radiate radio waves in many directions, it is suitable to arrange the antennas along respective surfaces of a housing of the mobile terminal.

Japanese Patent No. 6168258 (Patent Document 1) discloses a configuration in which, in an antenna module including a multilayer substrate including a rigid portion in which a radiation element is disposed and a flexible portion in which a transmission line is formed and that has flexibility, the rigid portion is bent with respect to an extending direction of the transmission line. By employing an antenna module in which a radiation element is disposed in such a flexible multilayer substrate, it is possible to easily incorporate the antenna module into a limited space in a housing.
Patent Document 1: Japanese Patent No. 6168258

BRIEF SUMMARY

Mobile terminals are required to be further miniaturized and thinned, so that antenna modules to be used for the mobile terminals are required to be further miniaturized.

On the other hand, in order to miniaturize the antenna module, when an effective area of an antenna element or a thickness of a dielectric layer of an antenna is reduced, there is a concern that antenna characteristics deteriorate.

The present disclosure provides a miniaturized antenna module that can be disposed in a limited space in a communication device while suppressing a reduction in antenna characteristics.

An antenna module according to an aspect of the present disclosure includes a dielectric substrate and a first radiation element disposed on the dielectric substrate. The dielectric substrate includes a first flat portion and a second flat portion having mutually different normal directions, and a first bent portion connecting the first flat portion and the second flat portion. The first flat portion has a first protruding portion partially protruding in a direction toward the second flat portion along the first flat portion from a boundary portion between the first bent portion and the first flat portion. The first flat portion and the first bent portion are connected to each other at a position where the first protruding portion is not provided in the first flat portion. At least a part of the first radiation element is disposed on the first protruding portion.

A manufacturing method of an antenna module according to another aspect of the present disclosure includes a first step of forming a slit having a substantially C-shape and penetrating in a thickness direction of a dielectric substrate. The substantially C-shape can include a U-shape that has two corners in the closed end. The slit has a first portion and a second portion facing each other, and a third portion connecting an end portion of the first portion and an end portion of the second portion. The manufacturing method further includes a second step of bending the dielectric substrate in the first portion and the second portion of the slit, and forming a first flat portion, a second flat portion, and a bent portion connecting the first flat portion and the second flat portion in the dielectric substrate. The second step includes steps of forming, in the first flat portion, a protruding portion partially protruding in a direction toward the second flat portion along the first flat portion from a boundary portion between the bent portion and the first flat portion by forming the bent portion, and disposing at least a part of a radiation element on the protruding portion.

According to the antenna module of the present disclosure, at least the part of the radiation element is disposed on the protruding portion of the first flat portion formed by bending the dielectric substrate. This makes it possible to dispose the radiation element in a dead space portion that is generated in a communication device. Further, since the first flat portion and the second flat portion of the dielectric substrate are connected to each other by the bent portion in a portion where the protruding portion is not formed, a thickness of the dielectric substrate in the protruding portion is maintained in the original thickness of the dielectric substrate. This makes it possible to suppress a decrease in antenna characteristics due to a reduction in thickness of the dielectric layer. Therefore, according to the antenna module of the present disclosure, it is possible to provide a miniaturized antenna module that can be disposed in a limited space in a communication device while suppressing a decrease in antenna characteristics.

DETAILED DESCRIPTION

Figure 1:
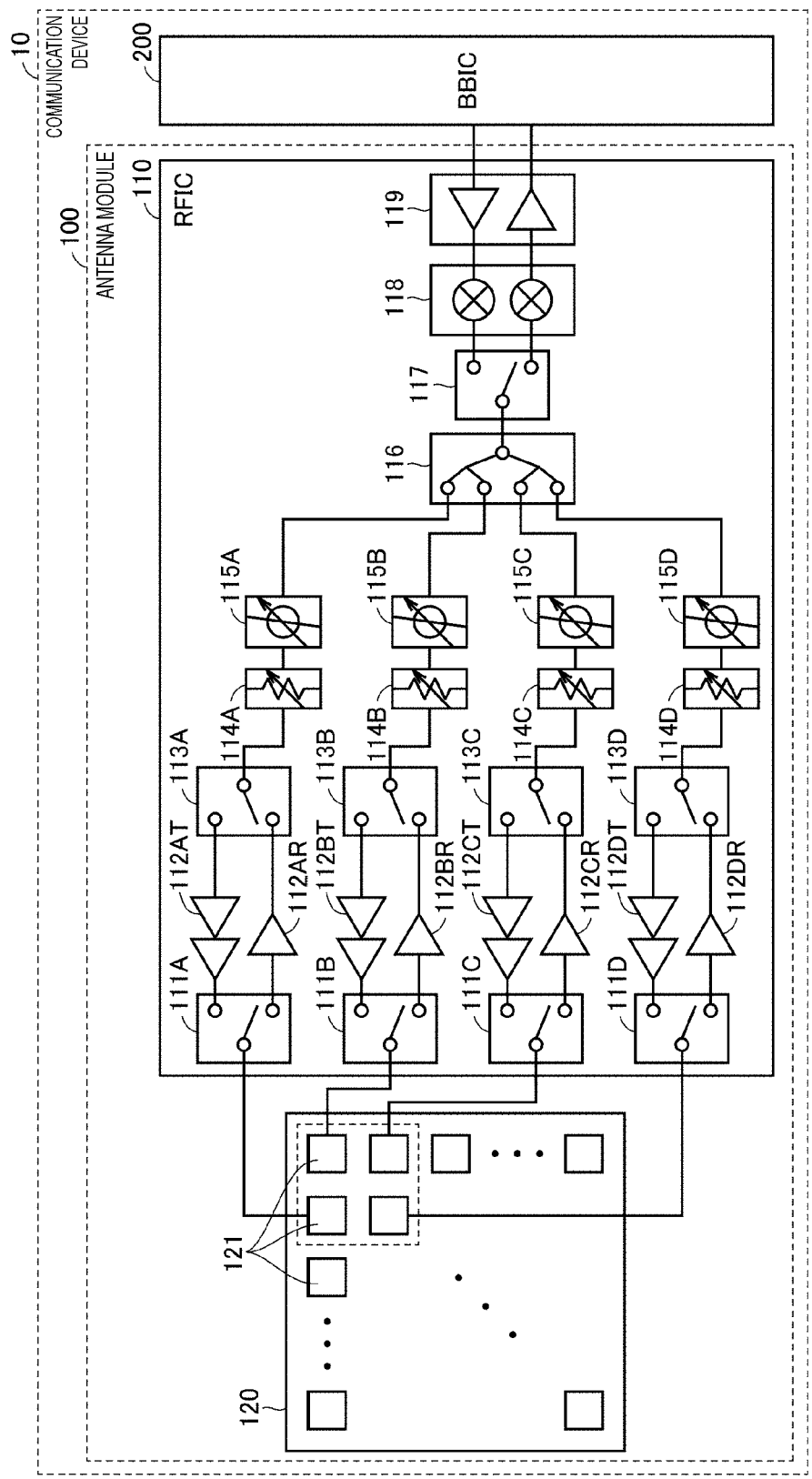
FIG. 1 is a block diagram of a communication device to which an antenna module according to Embodiment 1 is applied.

Hereinafter, embodiments of the present disclosure will be described in detail with reference to the drawings. Note that the same or corresponding parts in the drawings are denoted by the same reference signs, and description thereof will not be repeated.

Embodiment 1

(Basic Configuration of Communication Device)

FIG. 1 is an example of a block diagram of a communication device 10 to which an antenna module 100 according to Embodiment 1 is applied. The communication device 10 is, for example, a mobile terminal, such as a mobile phone, a smartphone, or a tablet, a personal computer having a communication function, or the like. Examples of a frequency band of radio waves to be used in the antenna module 100 according to the present embodiment include radio waves in a millimeter wave band having, for example, 28 GHz, 39 GHz, and 60 GHz as center frequencies, but radio waves in a frequency band other than those described above are also applicable.

With reference to FIG. 1, the communication device 10 includes the antenna module 100 and a BBIC 200 configuring a baseband signal processing circuit. The antenna module 100 includes an RFIC 110 which is an example of a power supply circuit, and an antenna device 120. The communication device 10 up-converts a signal transmitted from the BBIC 200 to the antenna module 100 into a radio frequency signal to radiate the radio frequency signal from the antenna device 120, and down-converts a radio frequency signal received by the antenna device 120 to process the down-converted signal in the BBIC 200.

In FIG. 1, for ease of description, only a configuration corresponding to four power supply elements 121 among a plurality of power supply elements 121 included in the antenna device 120 is illustrated, and configurations corresponding to the other power supply elements 121 having the same configuration are omitted. Note that FIG. 1 illustrates an example in which the antenna device 120 is formed by using the plurality of power supply elements 121 arranged in a two-dimensional array, but the plurality of the power supply elements 121 is not necessarily provided, and the antenna device 120 may be formed by using a single power supply element 121. In addition, the plurality of power supply elements 121 may be arranged in a row as a one-dimensional array. In the present embodiment, the power supply element 121 is a patch antenna having a substantially square flat plate shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, a mixer 118, and an amplification circuit 119.

When a radio frequency signal is transmitted, the switches 111A to 111D and 113A to 113D are switched to sides of the power amplifiers 112 AT to 112 DT, and the switch 117 is connected to a transmission-side amplifier of the amplification circuit 119. When a radio frequency signal is received, the switches 111A to 111D and 113A to 113D are switched to sides of the low-noise amplifiers 112 AR to 112 DR, and the switch 117 is connected to a reception-side amplifier of the amplification circuit 119.

A signal transmitted from the BBIC 200 is amplified by the amplification circuit 119, and is up-converted by the mixer 118. A transmission signal which is the up-converted radio frequency signal is demultiplexed into four demultiplexed signals by the signal multiplexer/demultiplexer 116, and the four demultiplexed signals pass through four signal paths, and are individually supplied to the different power supply elements 121. At this time, directivity of the antenna device 120 can be adjusted by individually adjusting phase shift degrees of the phase shifters 115A to 115D arranged in the respective signal paths.

Reception signals which are radio frequency signals received by the respective power supply elements 121 individually pass through the four different signal paths and are multiplexed by the signal multiplexer/demultiplexer 116. The multiplexed reception signal is down-converted by the mixer 118, amplified by the amplification circuit 119, and transmitted to the BBIC 200.

The RFIC 110 is formed as, for example, a one-chip integrated circuit component including the above-described circuit configuration. Alternatively, devices (switches, power amplifiers, low-noise amplifiers, attenuators, and phase shifters) corresponding to the respective power supply elements 121 in the RFIC 110 may be formed as one-chip integrated circuit component for each of the corresponding power supply elements 121.

(Configuration of Antenna Module)

Figure 2:
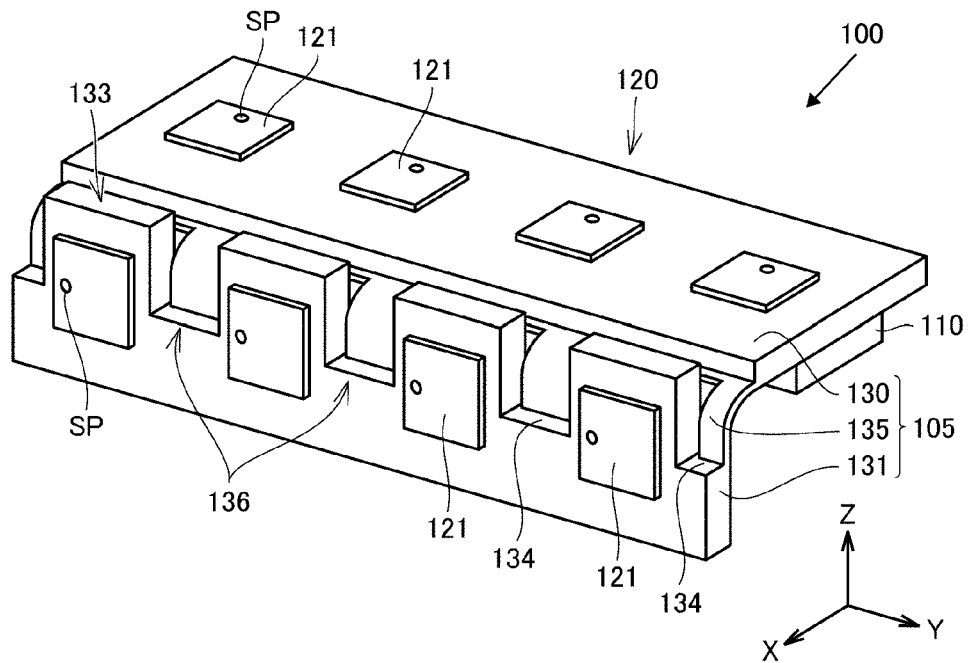
FIG. 2 is a perspective view of the antenna module according to Embodiment 1.

Next, the configuration of the antenna module 100 according to Embodiment 1 will be described in detail with reference to FIG. 2 and FIG. 3. FIG. 2 is a perspective view of the antenna module 100. Additionally, FIG. 3 is a cross-sectional view of the antenna module 100 in a state in which the antenna module 100 is mounted on a mounting substrate 20.

Figure 3:
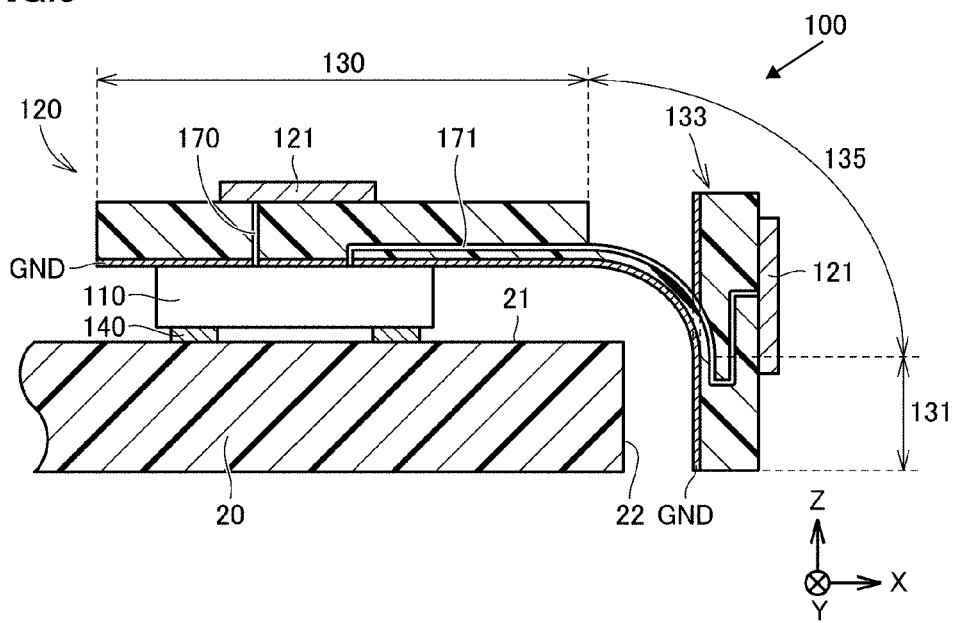
FIG. 3 is a cross-sectional view of the antenna module according to Embodiment 1.

With reference to FIG. 2 and FIG. 3, the antenna module 100 includes, in addition to the power supply elements 121 and the RFIC 110, a dielectric substrate 105, power supply wirings 170 and 171, and a ground electrode GND. Note that, in the following description, a positive direction of a Z-axis in each figure may be referred to as an upper surface side, and a negative direction may be referred to as a lower surface side in some cases.

The dielectric substrate 105 is, for example, a low temperature co-fired ceramic (LTCC) multilayer substrate, a multilayer resin substrate formed by laminating a plurality of resin layers formed of resin, such as epoxy, polyimide, or the like, a multilayer resin substrate formed by laminating a plurality of resin layers formed of liquid crystal polymer (LCP) having a lower dielectric constant, a multilayer resin substrate formed by laminating a plurality of resin layers formed of fluororesin, or a ceramic multilayer substrate other than LTCC. Note that the dielectric substrate 105 need not be a multilayer structure, and may be a single-layer substrate.

In the antenna device 120 of the antenna module 100, the dielectric substrate 105 has a substantially L-shaped cross-sectional shape, and includes a flat portion 130 with a Z-axis direction in FIG. 2 and FIG. 3 being as a normal direction, a flat portion 131 with an X-axis direction in FIG. 2 and FIG. 3 being as a normal direction, and a bent portion 135 connecting the two flat portions 130 and 131. Note that, in Embodiment 1, the flat portion 131 corresponds to the "first flat portion" of the present disclosure, and the flat portion 130 corresponds to the "second flat portion" of the present disclosure.

In the antenna module 100, four power supply elements 121 are arranged in a row in a Y-axis direction on each of the two flat portions 130 and 131. In the following description, for ease of understanding, an example in which the power supply elements 121 are arranged so as to be exposed on surfaces of the flat portions 130 and 131 will be described, but the power supply elements 121 may be arranged inside the dielectric substrate of the flat portions 130 and 131.

The flat portion 130 has a substantially rectangular shape, and four power supply elements 121 are arranged in a row on a surface of the flat portion 130. Further, the RFIC 110 is connected to a lower surface side (a surface in the negative direction of the Z-axis) of the flat portion 130. The RFIC 110 is mounted on a surface 21 of the mounting substrate 20 with solder bumps 140 interposed therebetween. Note that the RFIC 110 may be mounted on the mounting substrate 20 by using a multipolar connector instead of solder connection.

The flat portion 131 is connected to the bent portion 135 bent from the flat portion 130, and is disposed such that a surface of an inner side portion (a surface in a negative direction of the X-axis) of the flat portion 131 faces a side surface 22 of the mounting substrate 20. The flat portion 131 has a configuration in which a plurality of cutout portions 136 is formed in the dielectric substrate having a substantially rectangular shape, and the bent portion 135 is connected to the cutout portions 136. In other words, in a portion of the flat portion 131 where the cutout portion 136 is not formed, protruding portions 133 protruding in a direction toward the flat portion 130 (that is, in the positive direction of the Z-axis) along the flat portion 131 from a boundary portion 134 to which the bent portion 135 and the flat portion 131 are connected are formed. A protruding end of the protruding portion 133 is positioned in the positive direction of the Z-axis with respect to the surface on the lower surface side of the flat portion 130 (on the side facing the mounting substrate 20). Note that, in Embodiment 1, a surface on an upper surface side of the flat portion 130 (a surface positioned in an outer side portion) corresponds to a "first surface" of the present disclosure, and the surface on the lower surface side of the flat portion 130 (the surface facing the mounting substrate 20) corresponds to a "second surface" of the present disclosure. Further, in Embodiment 1, the bent portion 135 corresponds to the "first bent portion" of the present disclosure.

In the antenna module 100 in FIG. 2, four protruding portions 133 are formed corresponding to the four power supply elements 121 arranged on the flat portion 130. In addition, one power supply element 121 is arranged for each of the protruding portions 133. Each power supply element 121 in the flat portion 131 is arranged such that at least a part thereof overlaps with the protruding portion 133.

Note that, in Embodiment 1, one of the protruding portions 133 formed in the flat portion 131 corresponds to the "first protruding portion" of the present disclosure, and the other protruding portions 133 correspond to a "second protruding portion" of the present disclosure. In addition, in Embodiment 1, one of the power supply elements 121 arranged on the flat portion 131 corresponds to the "first radiation element" of the present disclosure, and the other power supply elements 121 arranged on the flat portion 131 correspond to a "second radiation element" of the present disclosure. In Embodiment 1, each of the power supply elements 121 arranged on the flat portion 130 corresponds to a "third radiation element" of the present disclosure.

The ground electrode GND is disposed on a surface facing the mounting substrate 20 or an inner layer of the flat portions 130 and 131 and the bent portion 135. A radio frequency signal from the RFIC 110 is transmitted to the power supply element 121 on the flat portion 130 through the power supply wiring 170. Further, a radio frequency signal from the RFIC 110 is transmitted to the power supply element 121 on the flat portion 131 through the power supply wiring 171. The power supply wiring 171 is connected to the power supply element 121 arranged on the flat portion 131 through an inside of each dielectric substrate of the flat portions 130 and 131 and an inside (or a surface) of the dielectric substrate of the bent portion 135 from the RFIC 110.

As will be described later in FIGS. 7A-7D, the flat portions 130 and 131 and the bent portion 135 are formed by partially processing and bending the dielectric substrate 105 having a flat plate shape. At this time, a thickness of the flat portion 131, including a portion of the protruding portion 133, is the same as a thickness of the flat portion 130. Accordingly, it is possible to suppress a decrease in antenna characteristics due to a decrease in thickness of the dielectric substrate for the power supply elements 121 on the flat portion 131.

Figure 4:
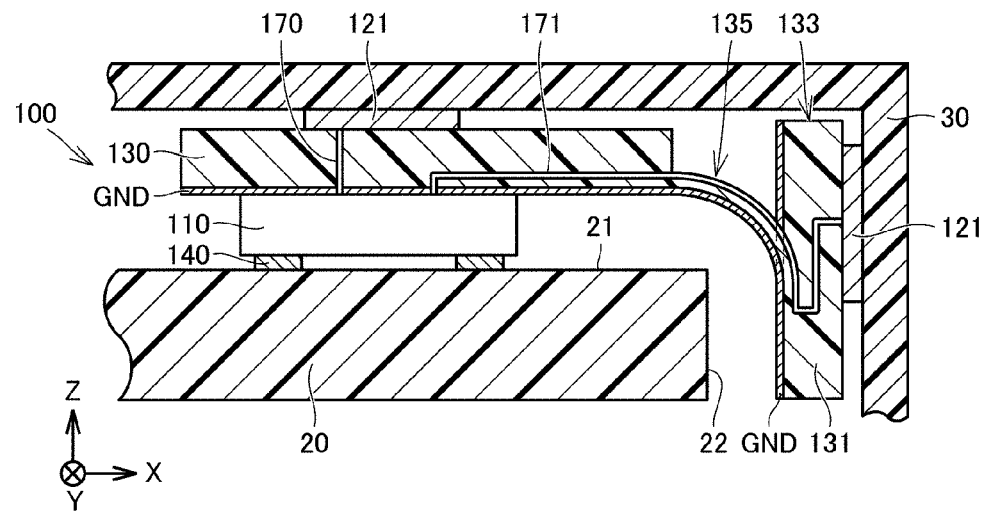
FIG. 4 is a cross-sectional view when the antenna module in FIG. 3 is incorporated in a housing.

FIG. 4 is a cross-sectional view of the antenna module 100 in a state in which the antenna module 100 is incorporated inside a housing 30 of the communication device 10. The antenna module 100 is arranged so as to face an inner side portion of two adjacent surfaces of the housing 30. In the example of FIG. 4, the housing 30 is formed of a dielectric material, such as resin or glass, and the power supply elements 121 are disposed so as to be in contact with the housing 30. Note that, when the power supply element 121 is disposed on an inner layer, the dielectric substrate (the flat portions 130 and 131) is disposed so as to be in contact with the housing 30. In addition, when the housing 30 is formed of a metal material, the housing 30 itself acts as a shield for blocking radio waves, so that a portion where the power supply element 121 faces is partially provided with a dielectric material.

Figure 5:
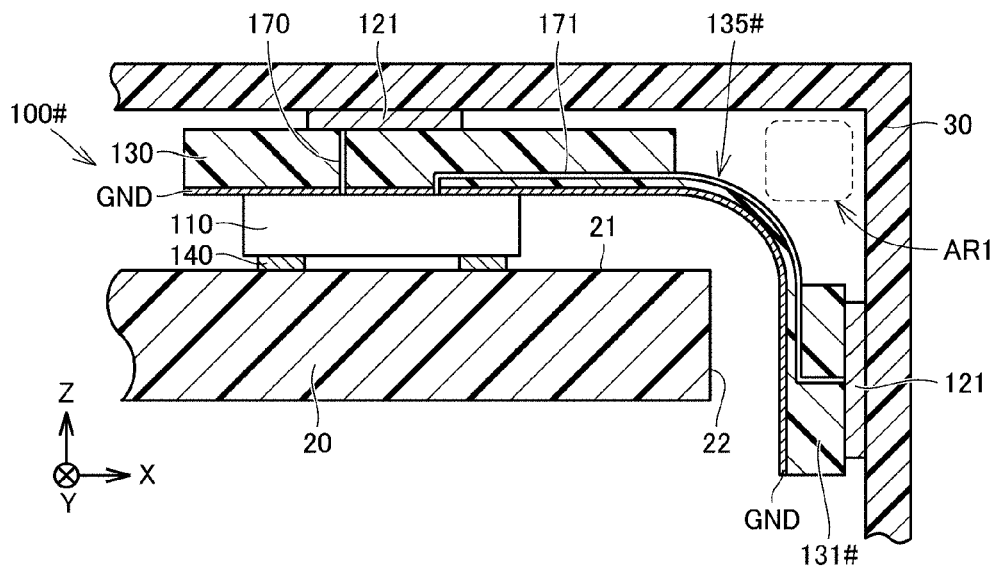
FIG. 5 is a cross-sectional view of an antenna module according to a comparative example.

FIG. 5 is a cross-sectional view of an antenna module 100 # according to a comparative example in a state in which the antenna module 100 # is incorporated in an inside of the housing 30. Unlike the flat portion 131 in the antenna module 100, a flat portion 131 # in the antenna module 100 # according to the comparative example does not protrude from a bent portion 135 #, and is disposed so as to further extend from an end portion of the bent portion 135 #. In the configuration, such as the antenna module 100 #, a region AR1 on an inner side portion of a corner portion of the housing 30 illustrated in FIG. 5 cannot be effectively utilized, and a dimension of the antenna module 100 # in a Z-axis direction is larger than a dimension of the antenna module 100 in the Z-axis direction in Embodiment 1.

In recent years, demands for miniaturizing and thinning of communication devices have been further increased, but when the dimension in the Z-axis direction is shortened in the structure, such as the antenna module 100 # according to the comparative example, it is suitable to reduce a size of the power supply element 121 arranged on the flat portion 131 #, and thus desired antenna characteristics may not be obtained.

On the other hand, as in Embodiment 1, by adopting the structure in which the flat portion 131 protrudes in the direction toward the flat portion 130 with respect to the bent portion 135, it is possible to dispose the power supply element 121 in the region AR1 illustrated in FIG. 5. Accordingly, it is possible to reduce the dimension of the entire antenna module in the Z-axis direction while maintaining the size of the power supply element 121. Therefore, it is possible to provide a miniaturized antenna module that can be disposed in a limited space in a communication device while suppressing a reduction in antenna characteristics.

Note that, as described above, in the antenna module 100 according to Embodiment 1, a thickness of the dielectric substrate in the protruding portion 133 is the same as a thickness of the dielectric substrate in the other portion of the flat portion 131. Therefore, it is possible to suppress a decrease in antenna characteristics due to a decrease in thickness of the dielectric substrate.

Figure 6:
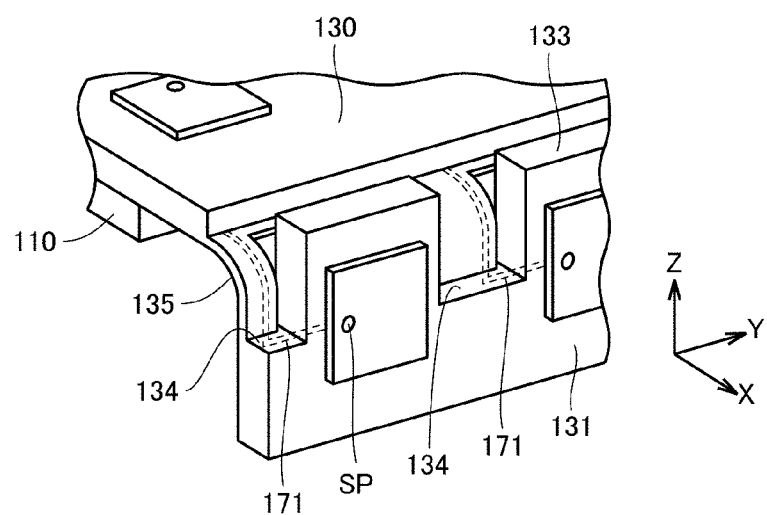
FIG. 6 is a diagram for describing a path of a power supply wiring in the antenna module according to Embodiment 1.

FIG. 6 is a diagram for describing a path of the power supply wiring 171 that transmits a radio frequency signal to the power supply element 121 on the flat portion 131. With reference to FIG. 6, the power supply wiring 171 passes through an inside of the dielectric substrate of the flat portion 130 from the RFIC 110, and reaches the flat portion 131 through the bent portion 135. In the flat portion 131, the power supply wiring 171 further extends to a position in the negative direction of the Z-axis with respect to the boundary portion 134 between the bent portion 135 and the flat portion 131, and is bent in the Y-axis direction from the position to be connected to the power supply element 121.

At this time, when the boundary portion 134 is positioned in the negative direction of the Z-axis with respect to a power supply point SP of the power supply element 121, a length of the power supply wiring 171 from the RFIC 110 to the power supply element 121 increases, and a loss in the power supply wiring 171 slightly increases, but since a curvature radius of the bent portion 135 can be made large, it is possible to reduce stress to be applied to the bent portion 135 and to suppress a damage to the bent portion 135. Further, since a protruding amount of the protruding portion 133 can be increased, the protruding end of the protruding portion 133 can be disposed at a higher position, and a degree of freedom in arrangement in the housing 30 can be increased.

On the other hand, when the boundary portion 134 is positioned in the positive direction of the Z-axis with respect to the power supply point SP of the power supply element 121, the length of the power supply wiring 171 can be shortened, and therefore, the loss in the power supply wiring 171 can be suppressed, but the bending processing of the flat portion 131 is less likely to be performed. The position of the boundary portion 134, that is, the protruding amount of the protruding portion 133 is appropriately set depending on an acceptable loss and the arrangement of the power supply elements 121 on the flat portion 131.

(Manufacturing Process)

Next, a manufacturing process of the antenna module 100 will be described with reference to FIGS. 7A-7D. The processes proceed from FIG. 7A to FIG. 7D. In each process, a plan view when the antenna module 100 is viewed from a normal direction (that is, the Z-axis direction) of the dielectric substrate 105 is illustrated in an upper row, and a cross-sectional view including a portion where the bent portion 135 is formed is illustrated in a lower row. Note that, in the cross-sectional view, for ease of description, a ground electrode, a power supply wiring, and a wiring pattern in the dielectric substrate are omitted.

Figure 7:
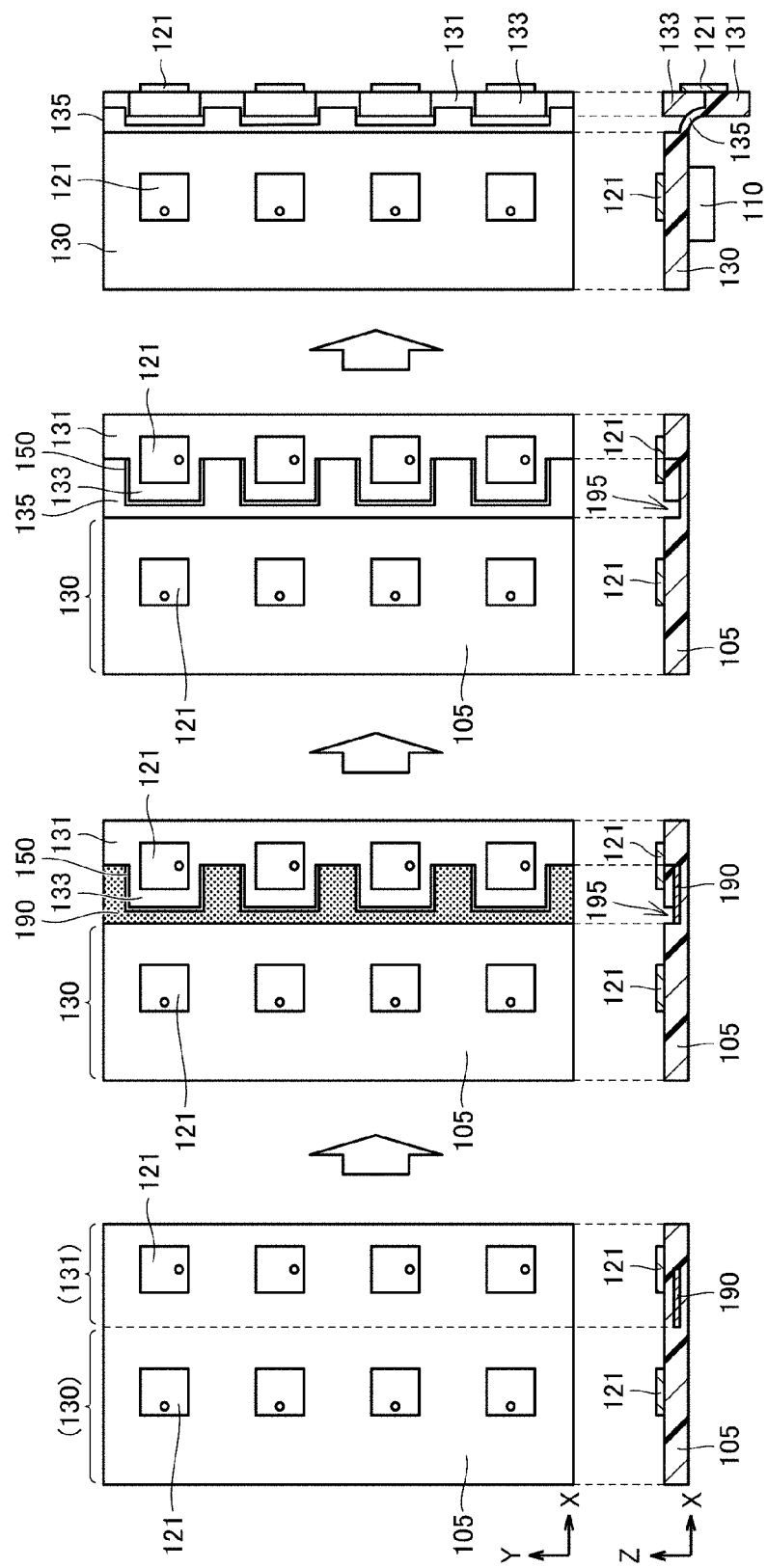
FIGS. 7A, 7B, 7C, and 7D are diagrams illustrating an overview of a manufacturing method of the antenna module according to Embodiment 1.

First, in a process illustrated in FIG. 7A, the dielectric substrate 105 is formed by laminating a plurality of dielectric layers each of which a dielectric and a metal film formed in a desired pattern are bonded to each other. A ground electrode, the power supply element 121, and the like are formed by the metal film of each dielectric layer. At this time, an electrode 190 having the same shape as that of the bent portion 135 is formed in an inner layer of a portion of the dielectric substrate 105 that serves as the flat portion 131.

Next, in a process illustrated in FIG. 7B, the dielectric in the portion where the bent portion 135 is formed is removed by laser processing, and a concave portion 195 is formed in the dielectric substrate 105. At this time, only the dielectric in an upper portion than the electrode 190 described above is removed by the laser. That is, the electrode 190 functions as a guard electrode for blocking the laser when the laser processing is performed. As a result, when the dielectric substrate 105 is seen in a plan view, the electrode 190 is exposed. With the electrode 190, a desired thickness of the bent portion 135 is ensured. Note that the power supply wiring 171 reaching the flat portion 131 is formed in a layer on the lower surface side than the electrode 190.

A slit 150 which penetrates the dielectric substrate 105 in the thickness direction is formed by the laser processing at a boundary portion between a portion to be the protruding portion 133 and a portion to be the bent portion 135. Note that the electrode 190 is not formed at a portion where the slit 150 is formed.

In the above-described process of FIG. 7B, an order of the process of forming the slit 150 and the process of forming the concave portion 195 is not particularly limited. That is, the concave portion 195 may be formed before the slit 150 is formed, or the concave portion may be formed after the slit 150 is formed. Note that, in the laser processing in forming the slit 150, dirt may adhere to the surrounding dielectric due to smear (soot) generated during the processing. Therefore, by forming the concave portion 195 after forming the slit 150, it is possible to remove the dielectric to which the dirt adheres in forming the concave portion 195, and it is possible to suppress an appearance defect in a final product.

Thereafter, in a process illustrated in FIG. 7C, the exposed electrode 190 is removed by performing etching processing. Note that, in a case where the power supply element 121 is disposed on the surface of the dielectric substrate 105, mask processing is applied to a portion of the power supply element 121 by using resist or the like before the etching processing.

Then, in a process illustrated in FIG. 7D, the dielectric substrate 105 is bent along the Y-axis at a portion of the bent portion 135. As a result, a normal line of the flat portion 131 is directed in the X-axis direction. At this time, since the slit 150 is formed, a part of the dielectric substrate rises from a surface of the bent portion 135, the protruding portion 133 is formed, and at least a part of the power supply element 121 is disposed on the protruding portion 133. Thereby, the antenna device 120 is formed. Thereafter, the RFIC 110 is connected to a lower surface side of the flat portion 130, so that the antenna module 100 is formed.

Note that the removal of the dielectric may be performed by a processing method (for example, router processing) other than the laser processing. In this case, the electrode 190 that functions as the guard electrode is not required.

(Slit Shape)

In the bending process of FIG. 7D, it is desirable to bend the dielectric substrate 105 in a straight line along the Y-axis throughout the entire dielectric substrate 105. When a portion where stress concentration occurs (stress concentration point) exists in the slit 150 when the dielectric substrate 105 is bent, the dielectric substrate 105 is easily bent at the stress concentration point. Therefore, the slit 150 can have a shape in which the stress concentration is generated as much as possible in a portion to be bent, and in contrast, the stress concentration does not occur in a portion that is not required to be bent.

Figure 8:
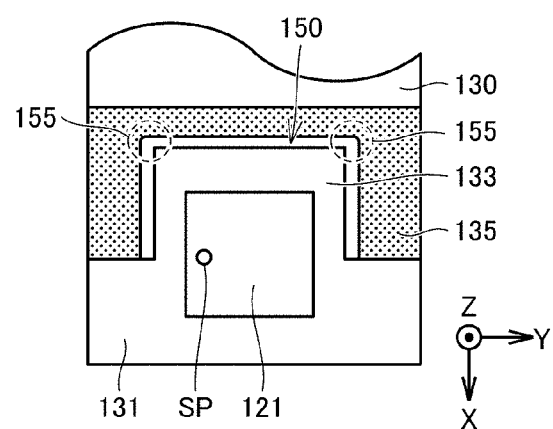
FIG. 8 is a diagram illustrating a first example of a slit shape.

FIG. 8 is a diagram illustrating a first example of a slit shape. As illustrated in FIG. 8, the slit 150 has an angular C-shape as a whole. Here, it is generally known that stress is likely to concentrate in an angular portion. Therefore, by forming corner portions 155 at which two slits (a first portion, a second portion) extending in the X-axis direction and facing each other and a slit (a third portion) extending in the Y-axis direction intersect each other in a circular arc shape having a predetermined curvature radius, stress concentration at the corner portions 155 can be reduced. Thereby, it is possible to suppress bending at the third portion of the slit 150 along the Y-axis direction. However, an inner side portion of the slit 150, that is, a corner portion having a convex shape at an end portion of the protruding portion 133 on which the power supply element 121 is disposed, can be in an angular shape in order to ensure an area of the ground electrode GND as large as possible.

Figure 9A:
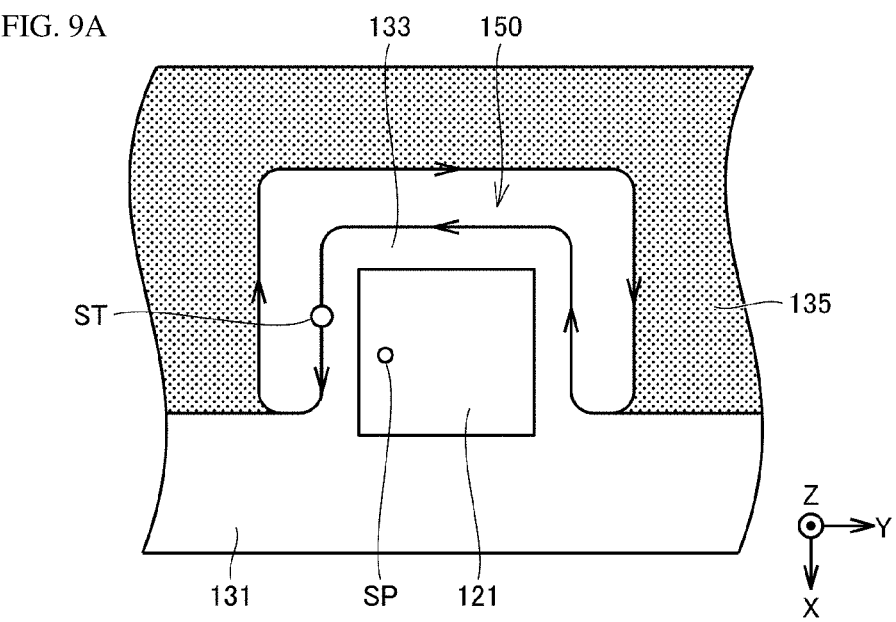
FIGS. 9A and 9B are diagram for describing a slit forming method.

In a case where the slit 150 is formed by the laser processing, when the laser is irradiated in a path returning from a start point ST along a boundary between the slit 150 and the dielectric substrate to the start point ST as illustrated in FIG. 9A, the corner portion having the convex shape of the end portion of the protruding portion 133 has a curved line having no small curvature. Further, when an end point of the processing does not coincide with the start point ST, the dielectric in a portion of the slit 150 is not removed, which may cause a processing defect.

Figure 9B:
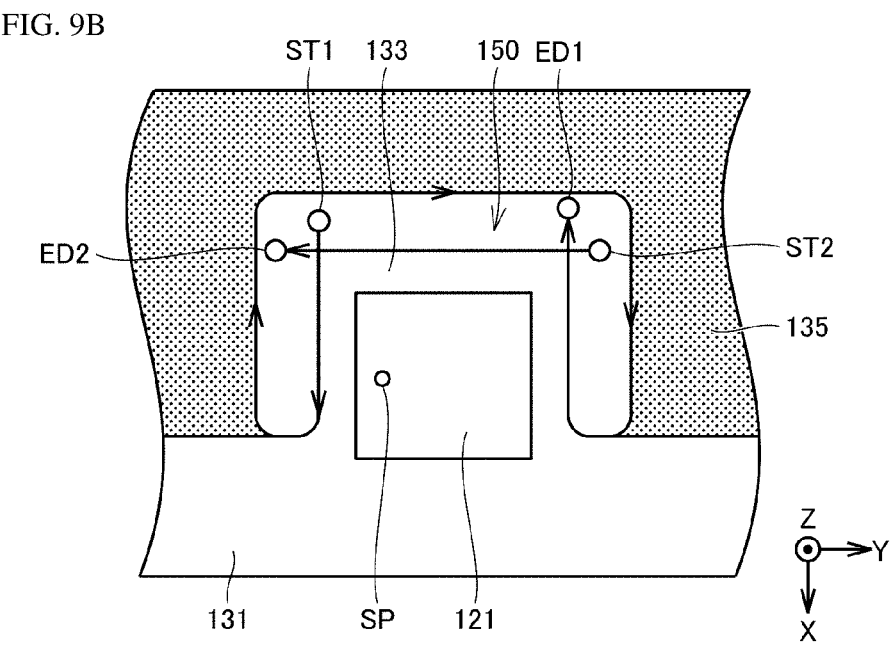

Therefore, as illustrated in FIG. 9B, the slit 150 can be formed by two processes. In a first process, the processing starts from a start point ST1 on an extension of the end portion along the X-axis of the protruding portion 133, the laser is irradiated along the boundary between the slit 150 and the dielectric substrate, and the irradiation of the laser is once ended at an end point ED1 on an extension line of the other end portion along the X-axis of the protruding portion 133. Then, in a second process, the irradiation of the laser is resumed from a start point ST2 on an extension of the end portion along the Y-axis of the protruding portion 133, and the laser is irradiated along the Y-axis to an end point ED2 on an extension of the other end portion along the Y-axis of the protruding portion 133.

By forming the slit 150 in such a process, it is possible to reduce the stress concentration by forming a corner portion having a concave shape of the substrate in a circular arc shape, and to secure the area of the ground electrode GND by forming a corner portion having a convex shape in an angular shape. Further, by making a start point and an end point of the irradiation of the laser different from each other, it is possible to suppress a processing defect in which a dielectric is not removed.

Figure 10:
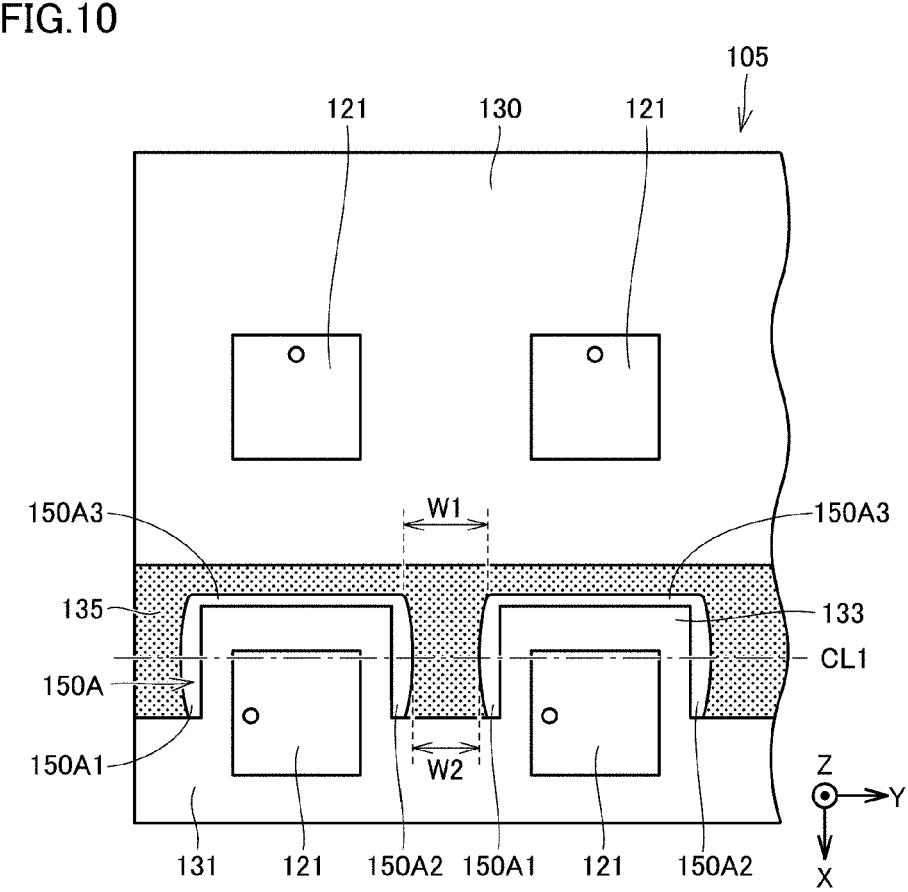
FIG. 10 is a diagram illustrating a second example of a slit shape.
Figure 11:
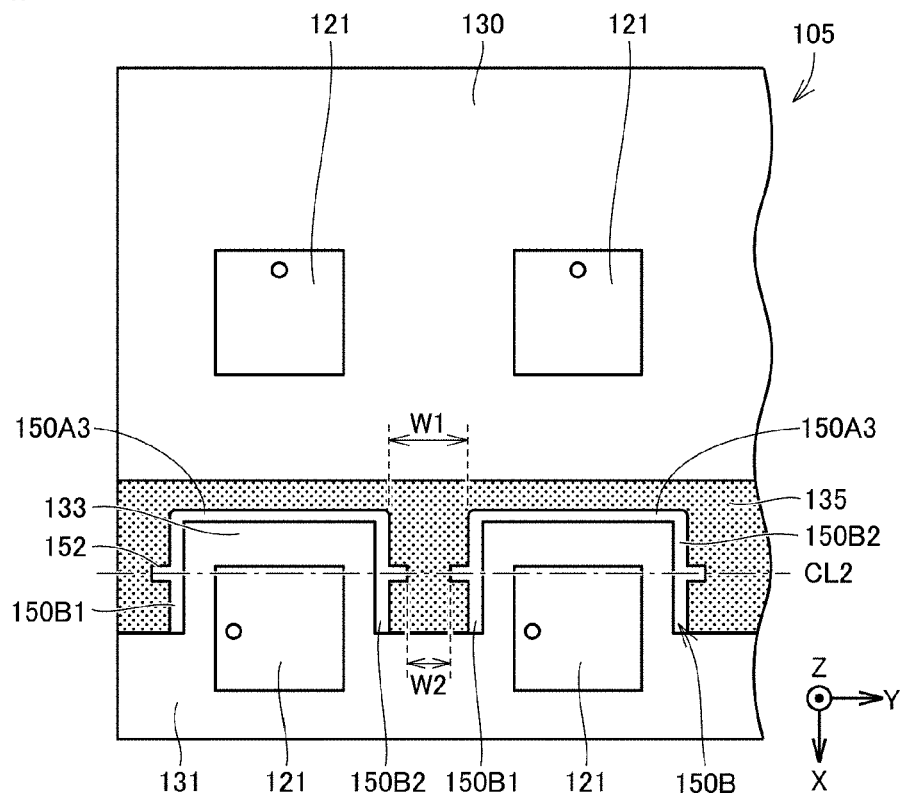
FIG. 11 is a diagram illustrating a third example of a slit shape.

FIG. 10 and FIG. 11 illustrate other examples of a slit shape. In each of a second example illustrated in FIG. 10 and a third example illustrated in FIG. 11, an example of a slit shape for bending the dielectric substrate 105 at a desired position is illustrated.

In a slit 150A of the second example in FIG. 10, a shape of a side of an outer side portion in each of slits (a first portion 150A1, a second portion 150A2) formed along the X-axis direction is formed in a circular arc shape, and a slit opening width gradually increases toward a central portion in the X-axis direction of the first portion 150A1 and the second portion 150A2. As a result, a portion of the bent portion 135 whose dimension (width) in the Y-axis direction is smaller than that in an end portion of the slit exists. In the example of FIG. 10, a width W2 of the bent portion 135 in a portion along a virtual line CL1 is the minimum width of the bent portion 135. Therefore, when the dielectric substrate 105 is bent, stress tends to concentrate on the portion where the width of the bent portion 135 is minimum, and as a result, the bent portion 135 bends along the virtual line CL1.

In a slit 150B of the third example of FIG. 11, in each of slits (a first portion 150B1 and a second portion 150B2) formed along the X-axis direction, a concave portion 152 is formed along a virtual line CL2 such that an opening portion of the slit is wider than that of both end portions of the slit. Accordingly, since a width of the bent portion 135 in a portion where the concave portion 152 is formed is minimum, when the dielectric substrate 105 is bent, stress tends to concentrate on the portion where the concave portion 152 is formed, and the bent portion 135 bends along the virtual line CL2.

As described above, the bending position can be adjusted by contriving the slit shape.

(Modifications)

Hereinafter, variations (modifications) of the antenna module will be described.

(Modifications of Cutout Portion: Modification 1, Modification 2)

In the antenna module 100 according to Embodiment 1, the example has been described in which the cutout portions 136 are formed between all the power supply elements 121 adjacent to each other on the flat portion 131, but it is optional to form the cutout portions 136 between all the power supply elements 121 adjacent to each other.

Figure 12:
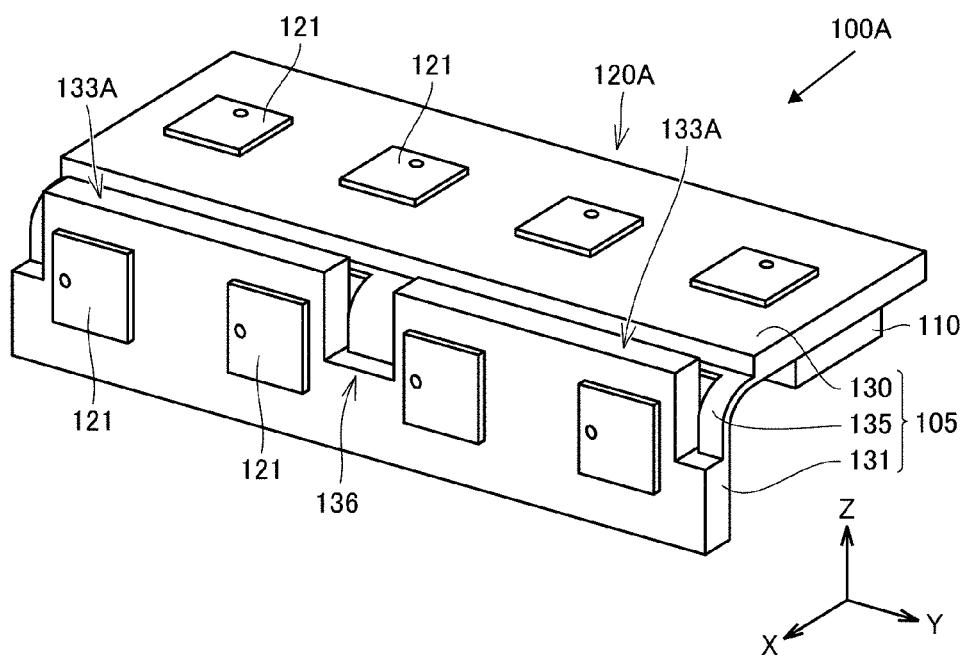
FIG. 12 is a perspective view of an antenna module according to Modification 1.

FIG. 12 is a perspective view illustrating an antenna module 100A according to Modification 1. In an antenna device 120A of the antenna module 100A, the cutout portion 136 is provided only between two power supply elements 121 in a central portion among four power supply elements 121, and the bent portion 135 is formed at positions of the cutout portion 136 and both end portions in the Y-axis direction of the flat portion 131. That is, in the antenna module 100A, two power supply elements 121 are formed in each of two protruding portions 133A.

Figure 13:
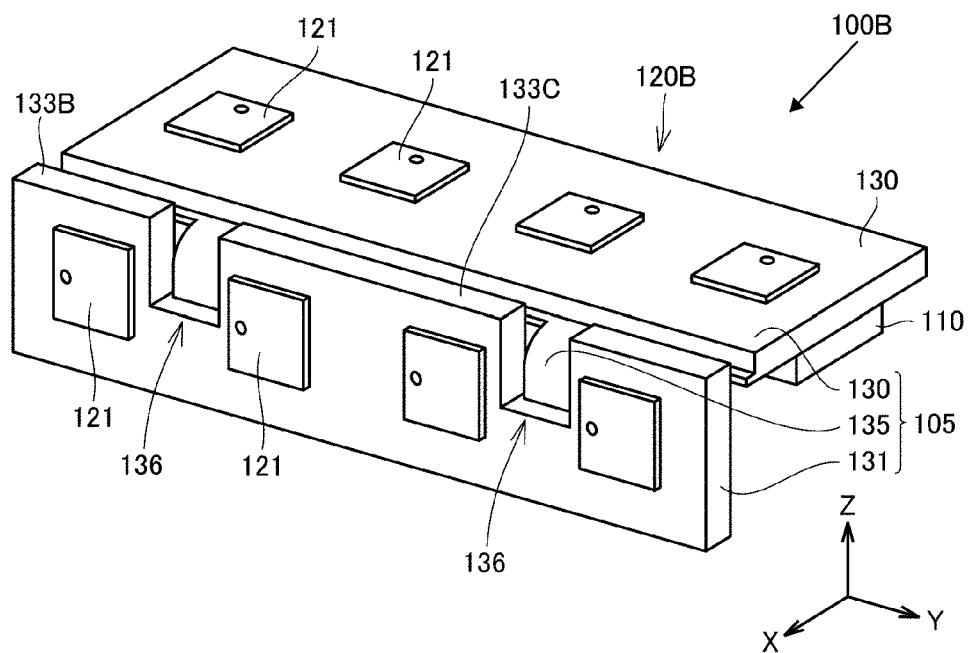
FIG. 13 is a perspective view of an antenna module according to Modification 2.

In addition, in an antenna device 120B of an antenna module 100B according to Modification 2 in FIG. 13, the cutout portions 136 are formed between first and second power supply elements 121 and between third and fourth power supply elements 121 among four power supply elements 121, and the bent portion 135 is formed at positions of the cutout portions 136. That is, in the antenna module 100B, one power supply element 121 is arranged in each of protruding portions 133B at both end portions of the flat portion 131, and two power supply elements 121 are arranged in a protruding portion 133C in a central portion.

The antenna module 100A according to Modification 1 and the antenna module 100B according to Modification 2 differ from each other in size and shape of the dielectric substrate 105 and the ground electrode GND in the flat portion 131, as compared with the antenna module 100, due to a difference in position at which the cutout portion 136 is formed. As described above, when the dielectric substrate 105 and the ground electrode GND are different from each other in size and shape, a current distribution flowing through the ground electrode GND changes, and directivity of an antenna array formed by the power supply elements 121 disposed on the flat portion 131 may change. Therefore, by changing the position at which the cutout portion 136 is formed, it is possible to increase a degree of freedom in design of the directivity and to achieve desired antenna characteristics.

Note that, in Modification 1, one of the protruding portions 133A corresponds to the "first protruding portion" of the present disclosure, and the other of the protruding portions 133A corresponds to the "second protruding portion" of the present disclosure. In addition, in Modification 2, one of the protruding portions 133B and 133C corresponds to the "first protruding portion" of the present disclosure, and the other of the protruding portions 133B and 133C corresponds to the "second protruding portion" of the present disclosure.

(Modifications of Bent Portion: Modification 3, Modification 4)

In the antenna module 100 according to Embodiment 1, the configuration in which the bent portion 135 having a smaller thickness of the dielectric substrate than thicknesses of the flat portion 131 and the flat portion 130 is formed along sides of the inner surfaces (that is, the surfaces facing the mounting substrate 20) of the flat portion 131 and the flat portion 130 has been described, but another configuration may be adopted for the shape and arrangement of the bent portion.

Figure 14:
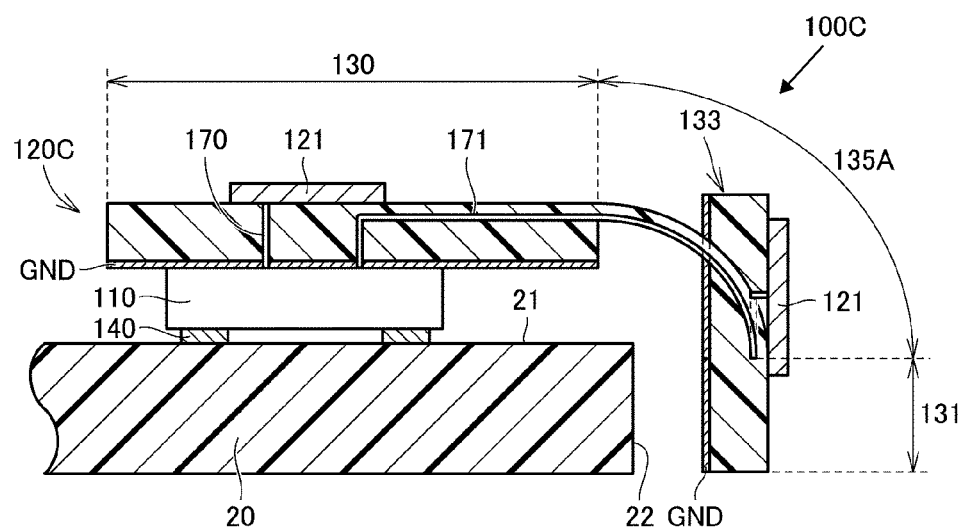
FIG. 14 is a cross-sectional view of an antenna module according to Modification 3.

In an antenna device 120C of an antenna module 100C according to Modification 3 in FIG. 14, a bent portion 135A is formed along sides of outer surfaces of the flat portion 131 and the flat portion 130 (that is, surfaces that do not face the mounting substrate 20). Note that a thickness of the dielectric substrate of the bent portion 135A is smaller than the thicknesses of the flat portion 131 and the flat portion 130. As in the antenna module 100C in FIG. 14, by forming the bent portion on the sides of the outer surfaces, a curvature radius of the bent portion can be increased, and therefore, stress applied to the bent portion can be reduced, and a damage to the bent portion can be suppressed. Further, since a space between the bent portion and the mounting substrate can be widened, a damage to the bent portion due to contact with the mounting substrate can be suppressed.

Note that although not illustrated in the figure, the bent portion may be formed such that intermediate positions in the thickness directions of the flat portion 131 and the flat portion 130 are connected to each other.

Further, when the dielectric substrate 105 forming the respective flat portions and the bent portion has sufficient flexibility, it is optional to make the thickness of the bent portion thinner than the thicknesses of the flat portion 130 and the flat portion 131.

Figure 15:
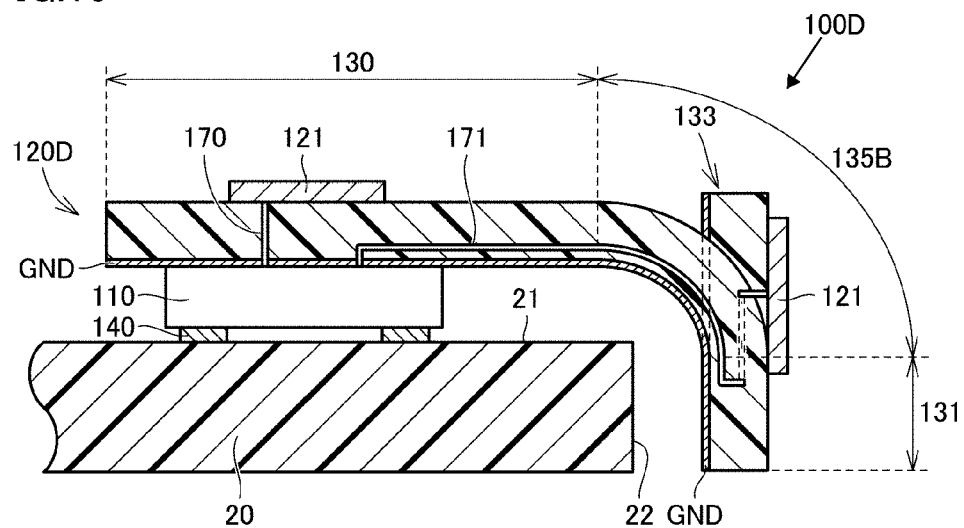
FIG. 15 is a cross-sectional view of an antenna module according to Modification 4.

In an antenna device 120D of an antenna module 100D according to Modification 4 illustrated in FIG. 15, a bent portion 135B has the same thickness as the thicknesses of the flat portion 130 and the flat portion 131. In this case, in a manufacturing process to be described later, a process of scraping the dielectric substrate in a portion corresponding to the bent portion can be omitted, and thus the manufacturing process can be simplified, leading to a reduction in cost. Further, it is possible to ensure durability of the portion of the bent portion 135B.

Note that the configurations of the cutout portions illustrated in Modifications 1 and 2 may also be applied to Modifications 3 and 4.

(Modifications of Single Antenna: Modification 5, Modification 6)

In Embodiment 1 and Modifications 1 to 4, a case of the antenna array in which the plurality of power supply elements is arranged has been described, however, the features disclosed in Embodiment 1 may be applicable to an antenna module in which only one power supply element is disposed.

Figure 16:
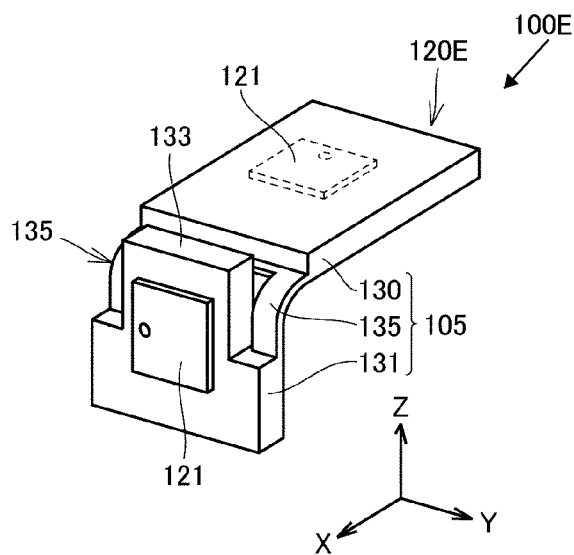
FIG. 16 is a perspective view of an antenna module according to Modification 5.

FIG. 16 is a perspective view of an antenna module 100E according to Modification 5. In an antenna device 120E of the antenna module 100E, one power supply element 121 is disposed on the flat portion 131. Only one protruding portion 133 is formed in the flat portion 131, and at least a part of the power supply element 121 is disposed on the protruding portion 133. Note that the flat portion 131 and the flat portion 130 are connected to each other by the bent portion 135 formed at both end portions in the Y-axis direction of the flat portion 131.

Figure 17:
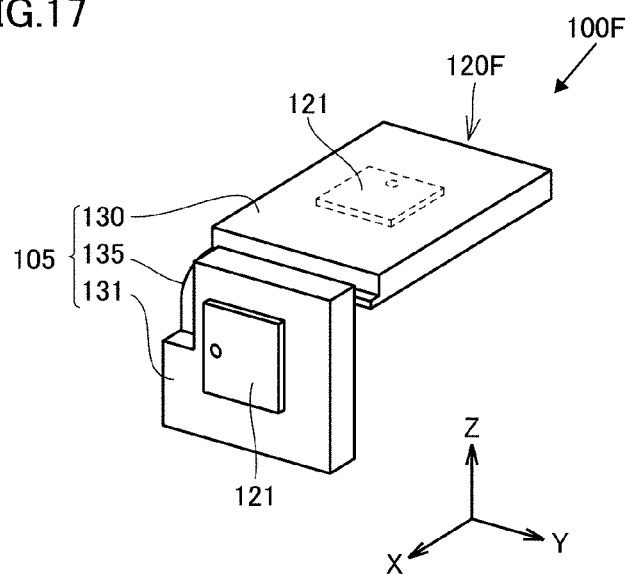
FIG. 17 is a perspective view of an antenna module according to Modification 6.

Note that, as long as connection strength between the flat portion 131 and the flat portion 130 can be secured, a position where the bent portion 135 is formed may be at one end portion in the Y-axis direction of the flat portion 131, as in an antenna device 120F of an antenna module 100F according to Modification 6 in FIG. 17.

Additionally, in each of Modifications in FIG. 16 and FIG. 17, an example of a configuration is illustrated in which the power supply element 121 is not formed on the flat portion 130, but, as indicated by broken lines in FIG. 16 and FIG. 17, the power supply element 121 may also be provided on the flat portion 130.

Embodiment 2

In the antenna module according to Embodiment 1, the example of the configuration has been described in which the protruding portions are formed in the flat portion (flat portion 131) facing the side surface of the mounting substrate.

In Embodiment 2, an example of an antenna module in which protruding portions are formed in a flat portion (the flat portion 130) facing a surface of a mounting substrate will be described.

Figure 18:
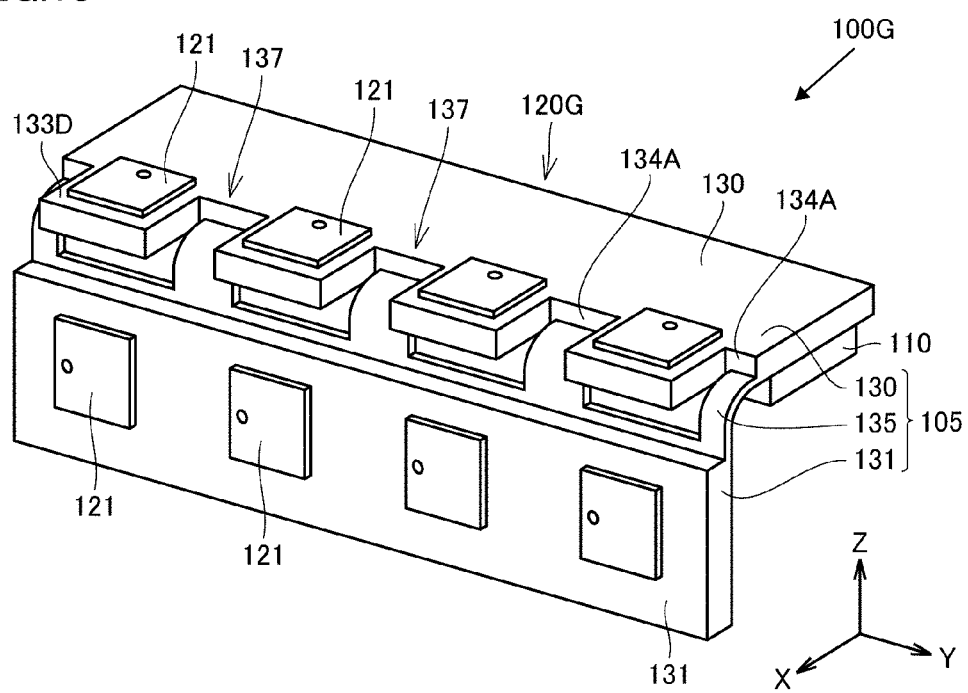
FIG. 18 is a perspective view of an antenna module according to Embodiment 2.

FIG. 18 is a perspective view of an antenna module 100G according to Embodiment 2. With reference to FIG. 18, the antenna module 100G includes an antenna device 120G and the RFIC 110. Similarly to the antenna device 120 according to Embodiment 1, the antenna device 120G includes the flat portions 130 and 131 and the bent portion 135 that configure the dielectric substrate 105. A cross-section of the dielectric substrate 105 has a substantially L-shape. The flat portion 130 with the Z-axis direction being as a normal direction and the flat portion 131 with the X-axis direction being as a normal direction are connected to each other by the bent portion 135.

The flat portion 131 has a substantially rectangular shape, and four power supply elements 121 are arranged in a row on a surface of the flat portion 131.

The flat portion 130 has a configuration in which a plurality of cutout portions 137 is formed in the dielectric substrate having a substantially rectangular shape, and the bent portion 135 is connected to the cutout portions 137. In portions of the flat portion 130 where the cutout portion 137 is not formed, protruding portions 133D that protrude in a direction toward the flat portion 131 along the flat portion 130 (that is, in the positive direction of the X-axis) from a boundary portion 134A where the bent portion 135 and the flat portion 130 are connected to each other are formed. Protruding ends of the protruding portions 133D are positioned in the positive direction of the X-axis with respect to a surface on the side of an inner surface (on the side facing the mounting substrate 20) of the flat portion 131.

In the antenna device 120G, four protruding portions 133D are formed corresponding to four power supply elements 121 arranged on the flat portion 131. Then, one power supply element 121 is arranged for each of the protruding portions 133D. Each power supply element 121 on the flat portion 131 is arranged such that at least a part of the power supply element 121 overlaps with the protruding portion 13

By configuring the antenna device as described above, the power supply element 121 on the flat portion 130 can be arranged in the region AR1 of the corner portion of the housing in the comparative example illustrated in FIG. 5. Therefore, it is possible to effectively utilize a limited space in a communication device. Note that, a dimension in the X-axis direction of the antenna device in the antenna module 100G according to Embodiment 2 is shorter than that in the antenna device 120 according to Embodiment 1, but a dimension in the Z-axis direction of the antenna device in the antenna module 100G is longer than that in the antenna device 120. The configuration, such as the antenna module 100G is effective when restriction on a dimension in a thickness direction of the communication device 10 is relatively small, and a mounting position on the mounting substrate 20 is limited. In recent years, an area of a bezel portion around a display screen has been narrowed in order to enlarge the screen of a smartphone. In such a case, the configuration, such as the antenna module 100G allows the power supply elements 121 on the flat portion 130 side to be disposed at an end portion of the housing as close as possible.

Note that, in Embodiment 2, the flat portion 130 corresponds to the "first flat portion" of the present disclosure, and the flat portion 131 corresponds to the "second flat portion" of the present disclosure. In Embodiment 2, a surface positioned in an outer side portion of the flat portion 131 corresponds to the "first surface" of the present disclosure, and a surface positioned in an inner side portion of the flat portion 131 corresponds to the "second surface" of the present disclosure. In Embodiment 2, one of the protruding portions 133D corresponds to the "first protruding portion" of the present disclosure, and the other protruding portions 133D correspond to the "second protruding portion" of the present disclosure.

Also, in Embodiment 2, one of the protruding portions 133D formed in the flat portion 130 corresponds to the "first protruding portion" of the present disclosure, and the other protruding portions 133D correspond to the "second protruding portion" of the present disclosure. Also, in Embodiment 2, one of the power supply elements 121 arranged on the flat portion 130 corresponds to the "first radiation element" of the present disclosure, and the other power supply elements 121 arranged on the flat portion 130 correspond to the "second radiation element" of the present disclosure. In Embodiment 2, each of the power supply elements 121 arranged on the flat portion 131 corresponds to the "third radiation element" of the present disclosure.

Figure 19:
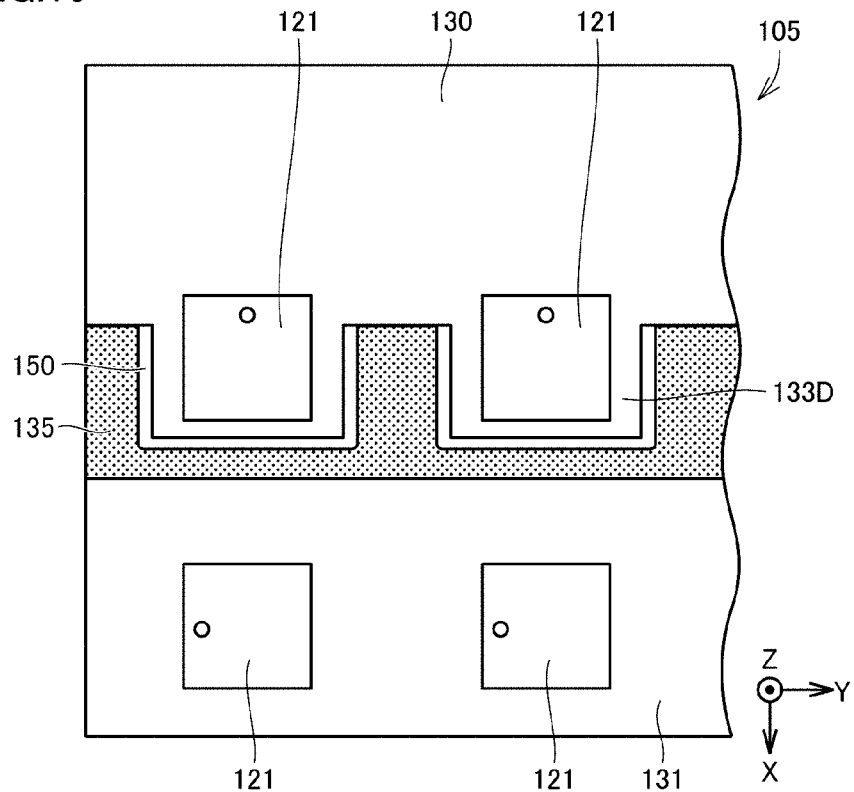
FIG. 19 is a diagram for describing a slit shape to be formed in a manufacturing process of the antenna module in FIG. 18.

FIG. 19 is a diagram for describing a slit shape to be formed in a manufacturing process of the antenna module 100G in FIG. 18. As illustrated in FIG. 19, in the dielectric substrate 105, a concave portion is formed by laser processing or the like in a portion where the bent portion 135 is formed. Then, the slit 150 penetrating in the thickness direction of the dielectric substrate 105 is formed at a boundary portion between the protruding portion 133D and the bent portion 135 in the flat portion 130. By forming such a slit, when the dielectric substrate 105 is bent at the portion of the bent portion 135, it is possible to implement the shape as illustrated in FIG. 18. Note that variations of the shape as illustrated in FIG. 8 to FIG. 11 may be applied to the slit shape.

Embodiment 3

In Embodiment 3, an example of a configuration in which protruding portions are formed on both flat portions will be described.

Figure 20:
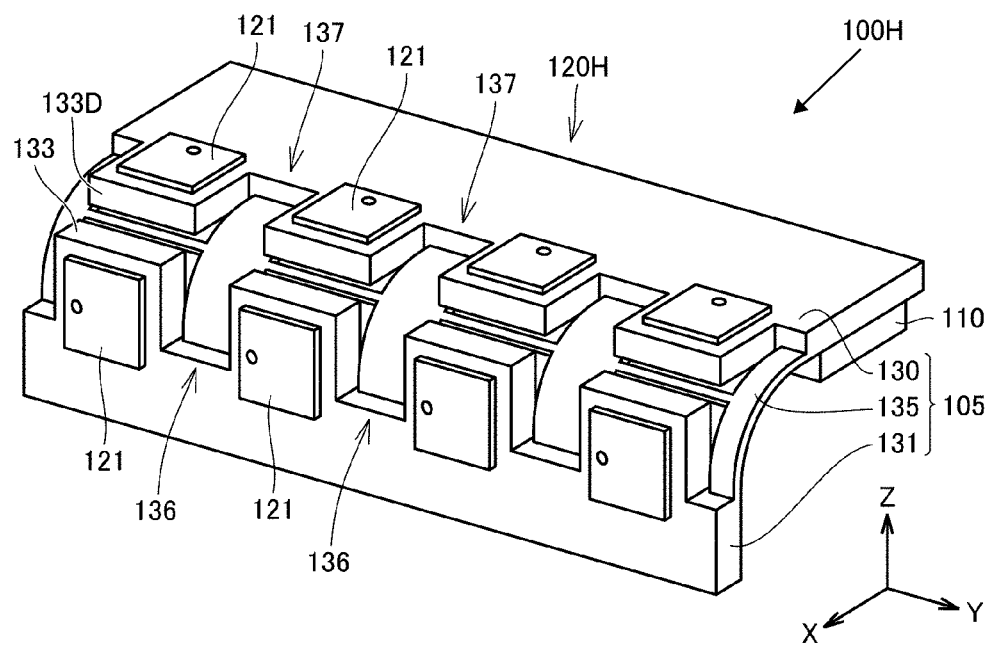
FIG. 20 is a perspective view of an antenna module according to Embodiment 3.

FIG. 20 is a perspective view of an antenna module 100H according to Embodiment 3. In an antenna device 120H of the antenna module 100H, the protruding portions 133 and 133D are formed on the two flat portions 130 and 131, respectively. In the antenna device 120H, the protruding portion 133D is formed at a position corresponding to the protruding portion 133, and the bent portion 135 is formed between the cutout portion 137 of the flat portion 130 and the cutout portion 136 of the flat portion 131. Additionally, the power supply element 121 is disposed at a position where at least a part of the power supply element 121 overlaps with the protruding portion on each flat portion.

With such a configuration, it is possible to dispose the antenna device in a limited space in a communication device. Further, since dimensions in the X-axis direction and the Z-axis direction of the antenna device can be shortened, it is possible to contribute to miniaturization of the antenna module and the communication device. Note that, in Embodiment 3, the flat portion 131 corresponds to the "first flat portion" of the present disclosure, and the flat portion 130 corresponds to the "second flat portion" of the present disclosure. Further, in Embodiment 3, one of the protruding portions 133 corresponds to the "first protruding portion" of the present disclosure, and the protruding portions 133D correspond to the "third protruding portion" of the present disclosure.

Figure 21:
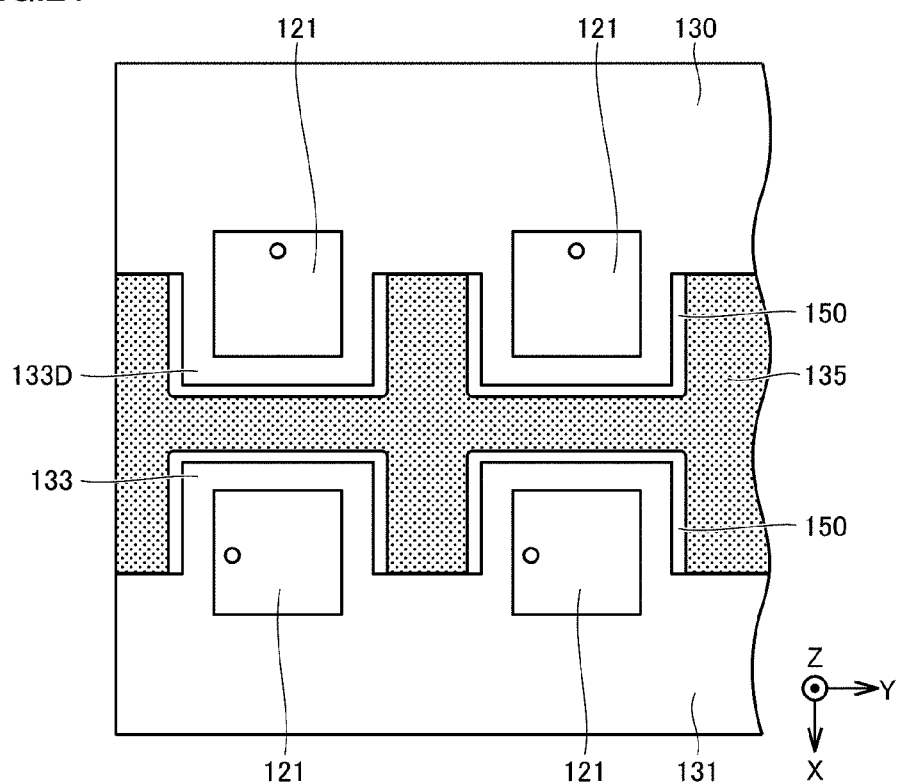
FIG. 21 is a diagram for describing a slit shape to be formed in a manufacturing process of the antenna module in FIG. 20.

FIG. 21 is a diagram for describing a slit shape to be formed in a manufacturing process of the antenna module 100H in FIG. 20. As illustrated in FIG. 21, before the dielectric substrate 105 is bent, the protruding portion 133D of the flat portion 130 and the protruding portion 133 of the flat portion 131 are formed so as to face each other. In addition, the slit 150 that penetrates in the thickness direction of the dielectric substrate 105 is formed at the boundary portion between the bent portion 135 and each protruding portion. By forming such a slit, it is possible to implement the shape of the antenna device 120H as illustrated in FIG. 20 when the dielectric substrate 105 is bent at the portion of the bent portion 135. Note that variations of the shape as illustrated in FIG. 8 to FIG. 11 may be applied to the slit shape.

Embodiment 4

In Embodiment 3, in the antenna device in which the protruding portions are formed in the two flat portions, as described above with reference to FIG. 21, both the protruding portions are formed so as to face each other. However, in the configuration according to Embodiment 3, in a state in which the dielectric substrate is bent, a position of a protruding end of one of the protruding portions does not reach a surface of the other of the protruding portions. Therefore, when the antenna module is incorporated in a housing, a space that cannot be slightly utilized at a corner portion of the housing may remain.

In Embodiment 4, an example of a configuration in which, between two protruding portions of one of the flat portions (that is, in a cutout portion), a protruding portion of the other of the flat portions is formed will be described.

Figure 22:
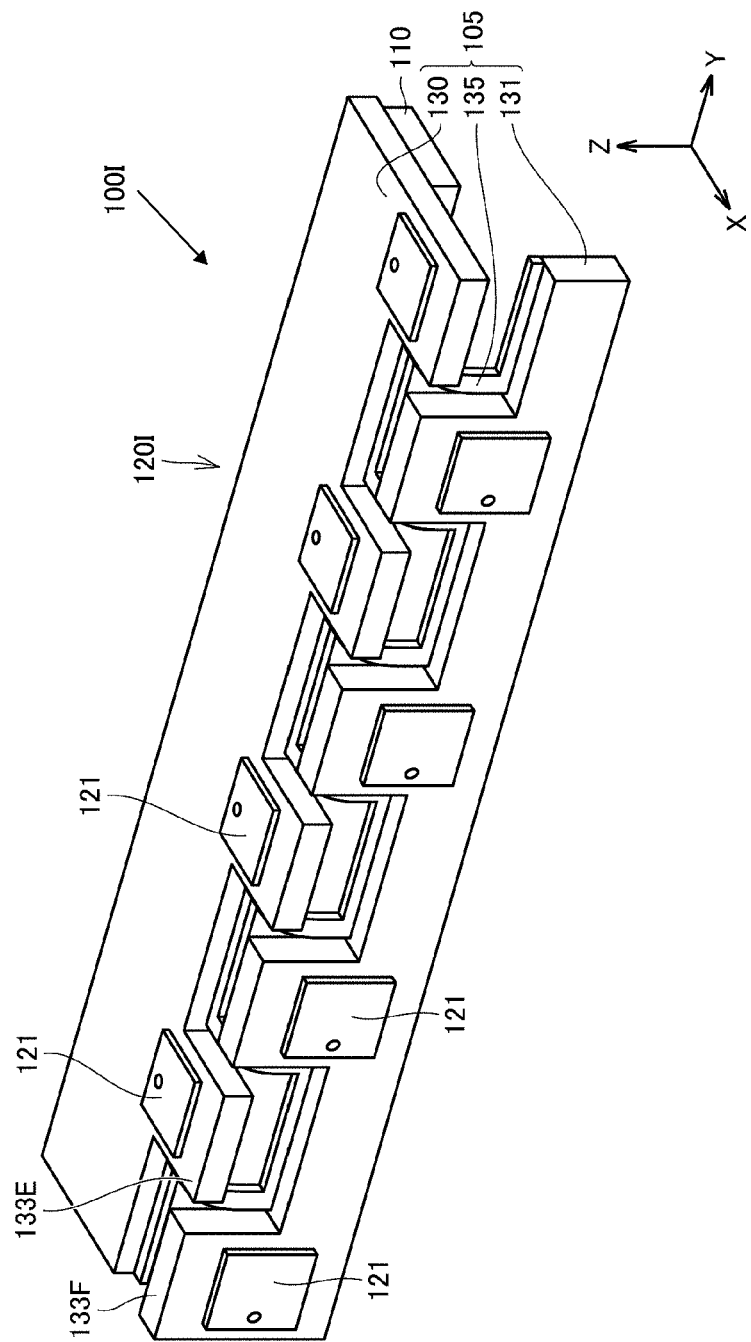
FIG. 22 is a perspective view of an antenna module according to Embodiment 4.

FIG. 22 is a perspective view of an antenna module 100I according to Embodiment 4. In an antenna device 120I of the antenna module 100I, similarly to the antenna device 120H according to Embodiment 3, protruding portions 133E and 133F are formed in the flat portions 130 and 131, respectively. Moreover, each of the protruding portions is formed at such a position that a protruding end of the protruding portion enters the cutout portion of the other of the flat portions. In other words, the respective protruding portions are formed such that the protruding portions 133E and the protruding portions 133F are alternately arranged. The bent portion 135 is formed between the protruding portion 133E and the protruding portion 133F.

On each flat portion, the power supply element 121 is arranged at a position where at least a part of the power supply element 121 overlaps the protruding portion. That is, the power supply elements 121 on the flat portion 130 and the power supply elements 121 on the flat portion 131 are arranged in a zigzag shape.

With such a configuration, although a dimension in the Y-axis direction of the antenna module is slightly longer, dimensions in the X-axis direction and the Z-axis direction can be shortened. Further, it is possible to incorporate the antenna module into a housing so as not to leave a redundant space in a corner portion of the housing. Therefore, it is possible to effectively utilize a limited space in a communication device and to contribute to miniaturization of the antenna module and the communication device.

Note that, in Embodiment 4, the flat portion 131 corresponds to the "first flat portion" of the present disclosure, and the flat portion 130 corresponds to the "second flat portion" of the present disclosure. In Embodiment 4, the protruding portion 133E corresponds to the "first protruding portion" of the present disclosure, and the protruding portion 133F corresponds to the "third protruding portion of the present disclosure.

Figure 23:
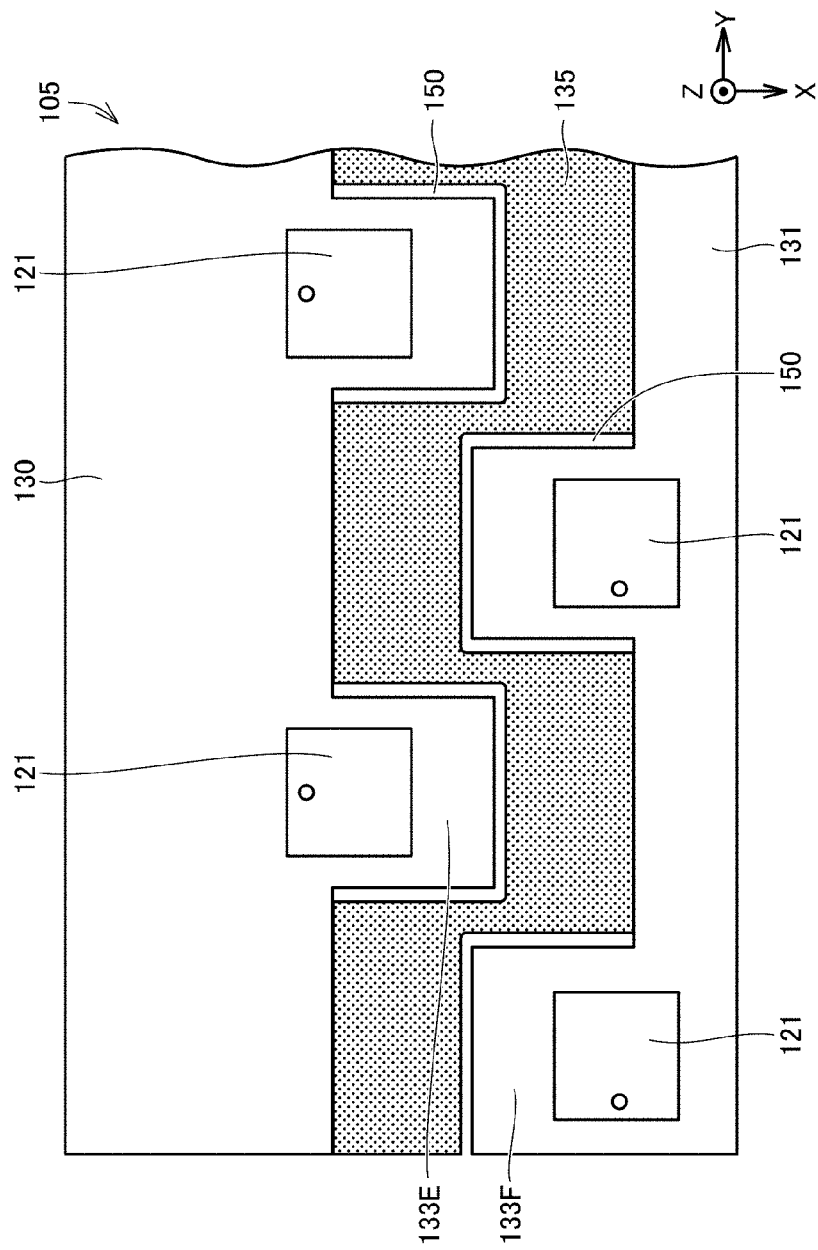
FIG. 23 is a diagram for describing a slit shape to be formed in a manufacturing process of the antenna module in FIG. 22.

FIG. 23 is a diagram for describing a slit shape to be formed in a manufacturing process of the antenna module 100I in FIG. 22. As illustrated in FIG. 23, before the dielectric substrate 105 is bent, the protruding portions 133E on the flat portion 130 and the protruding portions 133F on the flat portion 131 are formed so as to be alternately arranged. At this time, the protruding end of the protruding portion 133E is positioned so as to be offset in the positive direction of the X-axis from a position of the protruding end of the protruding portion 133F. In addition, the slit 150 that penetrates in the thickness direction of the dielectric substrate 105 is formed at the boundary portion between the bent portion 135 and each protruding portion. With such a configuration, when the dielectric substrate 105 is bent, the protruding portion 133E can be disposed between the two protruding portions 133F, and the shape of the antenna device 120I as illustrated in FIG. 22 can be implemented. Note that variations of the shape as illustrated in FIG. 8 to FIG. 11 may be applied to the slit shape.

Embodiment 5

In Embodiments 1 to 4, the example of the antenna module capable of radiating radio waves in two directions has been described. In Embodiment 5, an example of an antenna module capable of radiating radio waves in three directions will be described.

Figure 24:
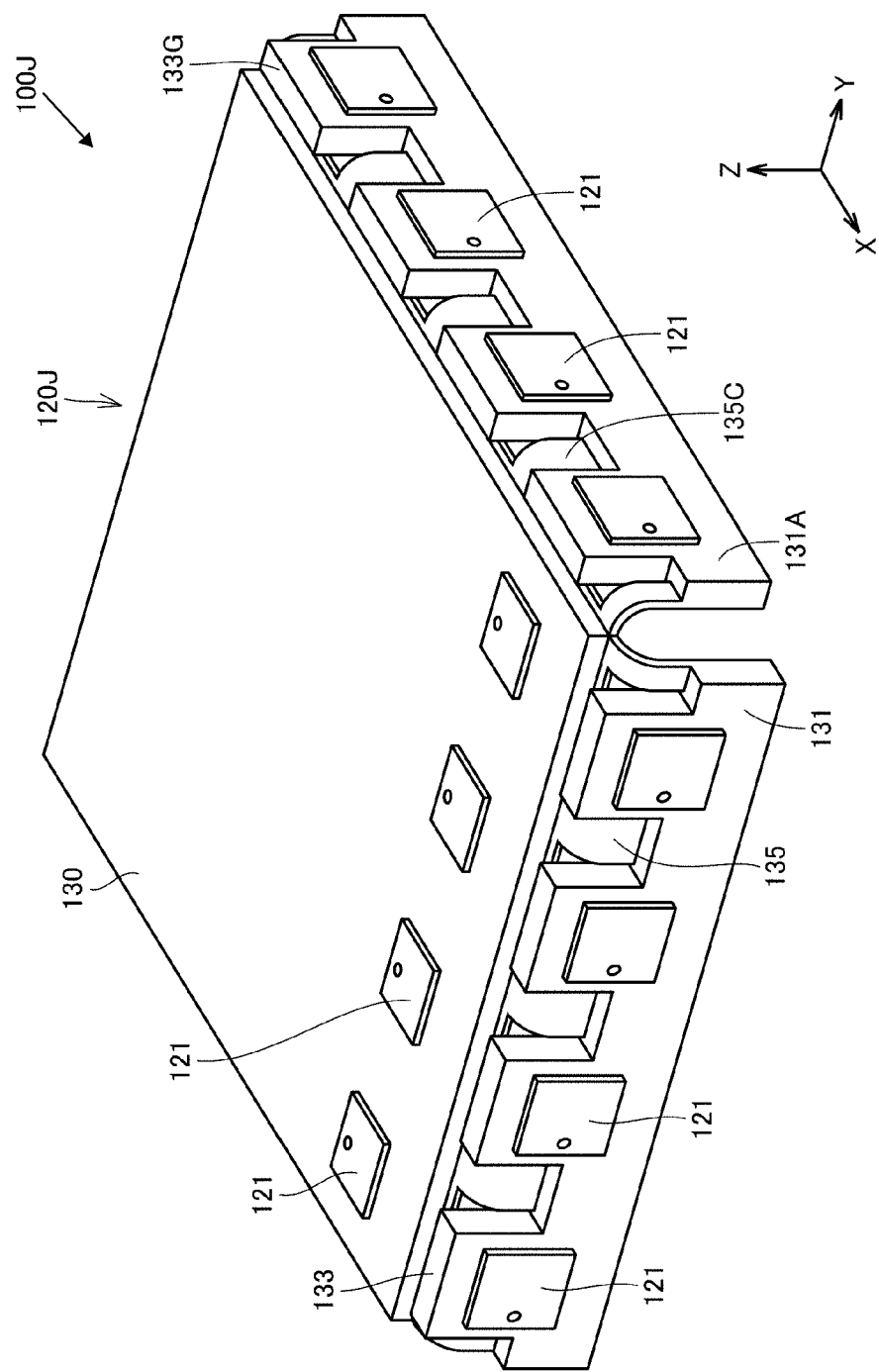
FIG. 24 is a perspective view of an antenna module according to Embodiment 5.

FIG. 24 is a perspective view of an antenna module 100J according to Embodiment 5. With reference to FIG. 24, in an antenna device 120J of the antenna module 100J, the flat portion 130 with the Z-axis direction being as the normal direction has a substantially square flat plate shape, and a flat portion 131A is also formed on the side of a side along the X-axis of the flat portion 130, in addition to the flat portion 131 formed on the side of a side along the Y-axis of the flat portion 130. The flat portion 131A has the same shape as that of the flat portion 131, and a plurality of protruding portions 133G is formed therein. The flat portion 131A is connected to the flat portion 130 by a bent portion 135C. On the flat portion 131A, the power supply element 121 is disposed such that at least a part thereof overlaps with the protruding portion 133G. By disposing the antenna device 120J having such a shape at a corner portion where three surfaces of a housing intersect each other, it is possible to radiate radio waves in three directions that are the X-axis direction, the Y-axis direction, and the Z-axis direction. Then, it is possible to effectively utilize a space of the corner portion where three surfaces of the housing intersect each other.

Note that, in Embodiment 5, the flat portion 131A corresponds to a "third flat portion" of the present disclosure. In addition, in Embodiment 5, the bent portion 135C corresponds to a "second bent portion" of the present disclosure, and the protruding portion 133G corresponds to a "fourth protruding portion" of the present disclosure. In Embodiment 5, each of the power supply elements 121 arranged on the flat portion 131A corresponds to a "fourth radiation element" of the present disclosure.

Figure 25:
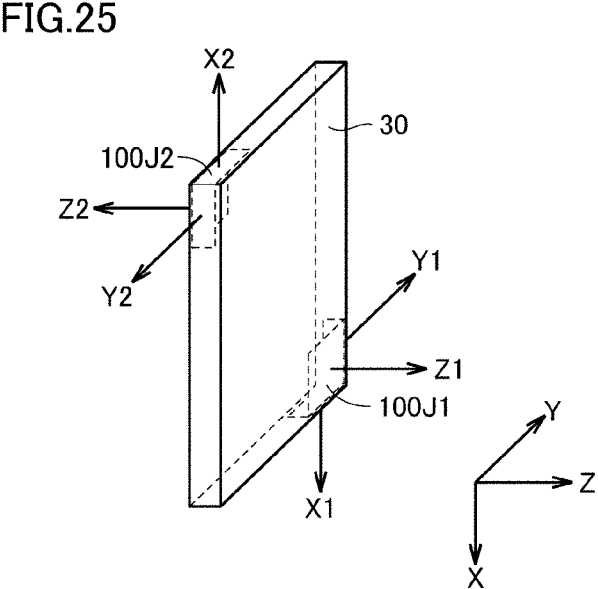
FIG. 25 is a diagram for describing radiation directions of radio waves when the antenna modules in FIG. 24 are mounted on a housing.

FIG. 25 is a diagram for describing radiation directions of radio waves when the antenna modules 100J in FIG. 24 are mounted on the housing 30. In FIG. 25, the antenna module illustrated in FIG. 24 is disposed at each of the corner portions at diagonal positions of the housing 30 having a substantially rectangular parallelepiped shape. Two antenna modules 100J1 and 100J2 are arranged such that the flat portions 130 mutually face opposite directions. Accordingly, radio waves are radiated from the antenna module 100J1 in the positive directions of the X-axis, the Y-axis, and the Z-axis (that is, in X1, Y1, and Z1 directions), and radio waves are radiated from the antenna module 100J2 in the negative directions of the X-axis, the Y-axis, and the Z-axis (that is, X2, Y2, and Z2 directions). Therefore, with such a communication device, it is possible to radiate radio waves in all directions.

(Modification)

Figure 26:
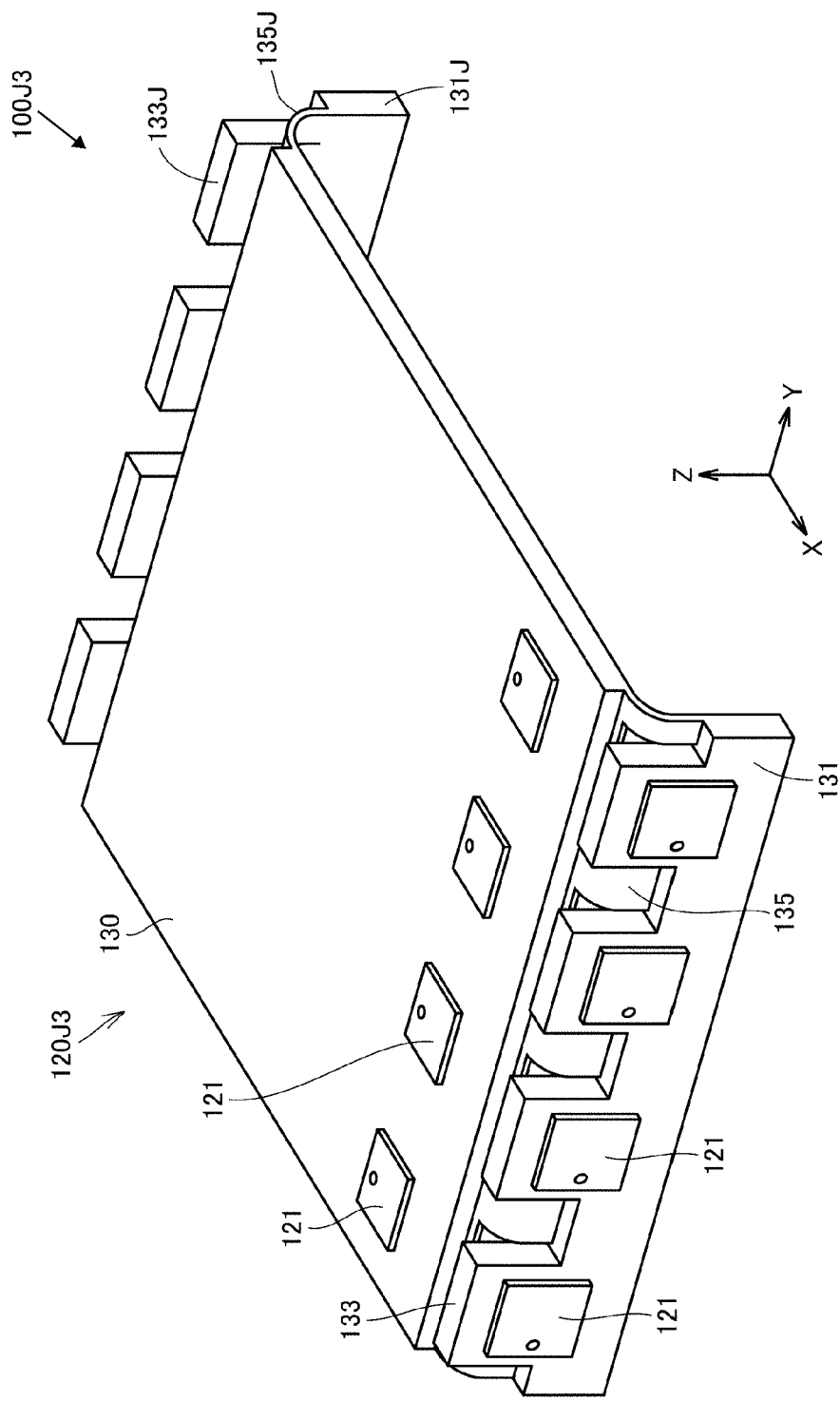
FIG. 26 is a perspective view of a modification of the antenna module according to Embodiment 5.

In the antenna device 120J of the antenna module 100J illustrated in FIG. 24, the configuration in which radio waves are radiated in the three directions that are the X-axis direction, the Y-axis direction and the Z-axis direction has been described, but a configuration may be applicable in which radio waves are radiated in three directions that are the positive direction of the X-axis, the negative direction of the X-axis, and the Z-axis direction, as in an antenna device 120J3 of an antenna module 100J3 of FIG. 26, for example.

In the antenna device 120J3 in FIG. 26, a flat portion 131J is formed on a side opposite to a side on which the flat portion 131 is formed, of the flat portion 130. The flat portion 131J has a shape similar to that of the flat portion 131, and a plurality of protruding portions 133J are formed thereon. The flat portion 131J is connected to the flat portion 130 by a bent portion 135J. Although power supply elements are not illustrated in FIG. 26 because the power supply elements are behind the protruding portions 133J, the power supply elements are arranged on the flat portion 131J such that at least a part of the power supply element overlaps the protruding portion 133J. Radio waves are radiated in the negative direction of the X-axis from the power supply elements arranged on the flat portion 131J.

Note that, in FIG. 26, the example has been described in which the flat portion is formed in the positive direction and the negative direction of the X-axis, but the flat portion may be formed in the positive direction and the negative direction of the Y-axis.

Embodiment 6

In the above-described embodiments, examples of a so-called single-band type antenna device in which only the power supply element is used as a radiation element and radio waves in one frequency band are radiated from each power supply element, and a single-polarization type antenna device in which radio frequency signals are supplied at one power supply point for each power supply element have been described. However, the features of the present disclosure are also applicable to a dual-band type antenna device capable of radiating radio waves in two frequency bands from a radiation element, and a dual-polarization type antenna device capable of radiating radio waves in two polarization directions from a radiation element.

Figure 27:
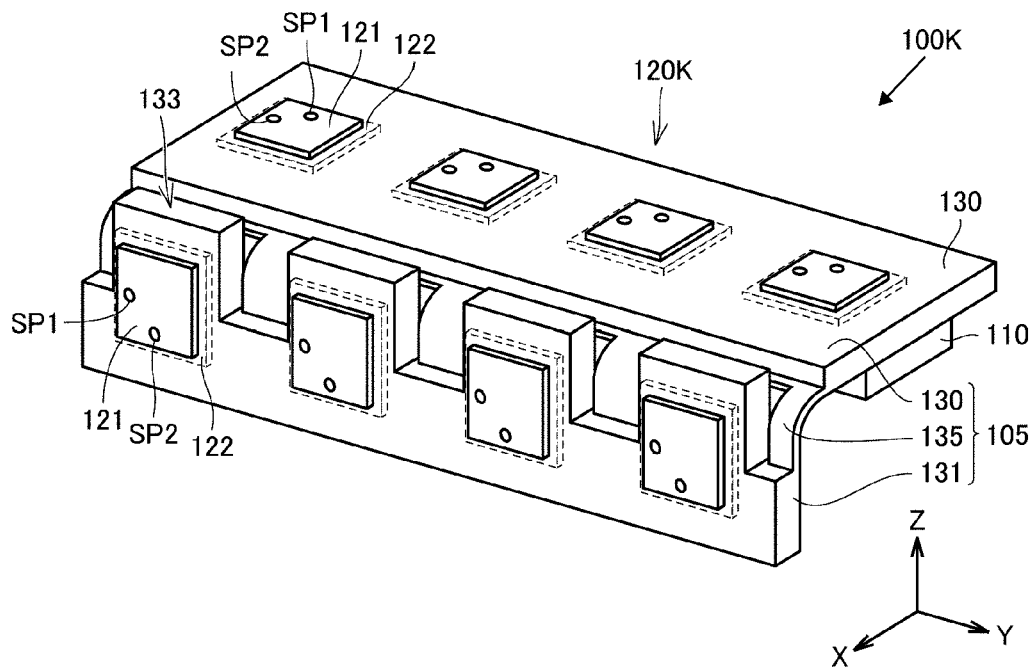
FIG. 27 is a perspective view of an antenna module according to Embodiment 6.

FIG. 27 is a perspective view of an antenna module 100K according to Embodiment 6. In an antenna device 120K of the antenna module 100K illustrated in FIG. 27, the dielectric substrate 105 has the same shape as that according to Embodiment 1, but radiation elements arranged on each of the flat portions are configured with the power supply elements 121 and parasitic elements 122.

The parasitic element 122 has a size larger than that of the power supply element 121. When viewed from a normal direction of each flat portion, the parasitic element 122 is disposed closer to an inner layer side of the dielectric substrate 105 than the power supply element 121 so as to overlap with the power supply element 121. Then, a power supply wiring (not illustrated) penetrates the parasitic element 122 to be connected to the power supply element 121. By forming the radiation elements in such a configuration, radio waves in mutually different frequency bands can be radiated from the power supply element 121 and the parasitic element 122.

In addition, in each power supply element 121, by connecting the power supply wiring from the RFIC 110 to two power supply points SP1 and SP2, it is possible to radiate two radio waves having different polarization directions from the respective power supply element 121 and parasitic element 122. For example, radio waves with the X-axis direction being as the polarization direction and radio waves with the Y-axis direction being as the polarization direction are radiated in the Z-axis direction from the radiation elements on the flat portion 130. Further, radio waves with the Y-axis direction being as the polarization direction and radio waves with the Z-axis direction being as the polarization direction are radiated in the X-axis direction from the radiation elements on the flat portion 131.

Note that, although the antenna module 100K has been described as an example of a dual-band and dual-polarization type antenna module, it may be a dual-band and single-polarization type antenna module, or a single-band and dual-polarization type antenna module. Further, an aspect of the radiation elements disposed on the flat portion 130 and an aspect of the radiation elements disposed on the flat portion 131 may be different from each other.

As described above, in an antenna module having a dielectric substrate formed in a substantially L-shaped cross-section by bending, at least one of the flat portions is formed with a protruding portion, and a power supply element is arranged such that at least a part of the power supply element overlaps with the protruding portion, so that when the antenna module is incorporated in a housing of a communication device, the power supply element can be arranged in a dead space at a corner portion of the housing. Also, even after the dielectric substrate is bent, a thickness of the protruding portion can be maintained at the same dimension as a thickness of the flat portion. Therefore, it is possible to provide a miniaturized antenna module that can be disposed in a limited space in a communication device while suppressing a reduction in antenna characteristics.

Embodiment 7

In the above-described embodiments, the configuration in which the RFIC 110 is mounted on the mounting substrate 20 and is connected to the flat portion 130 in the dielectric substrate 105 has been described.

In Embodiment 7, a configuration in which an RFIC is disposed on the flat portion 131 side connected to the bent portion 135 will be described.

Figure 28:
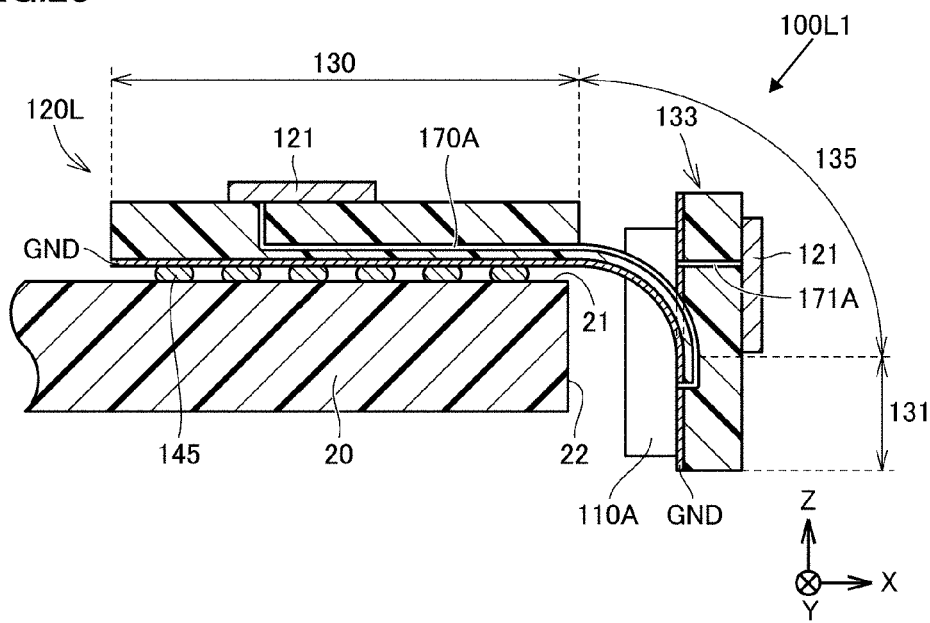
FIG. 28 is a cross-sectional view of a first example of an antenna module according to Embodiment 7.
Figure 29:
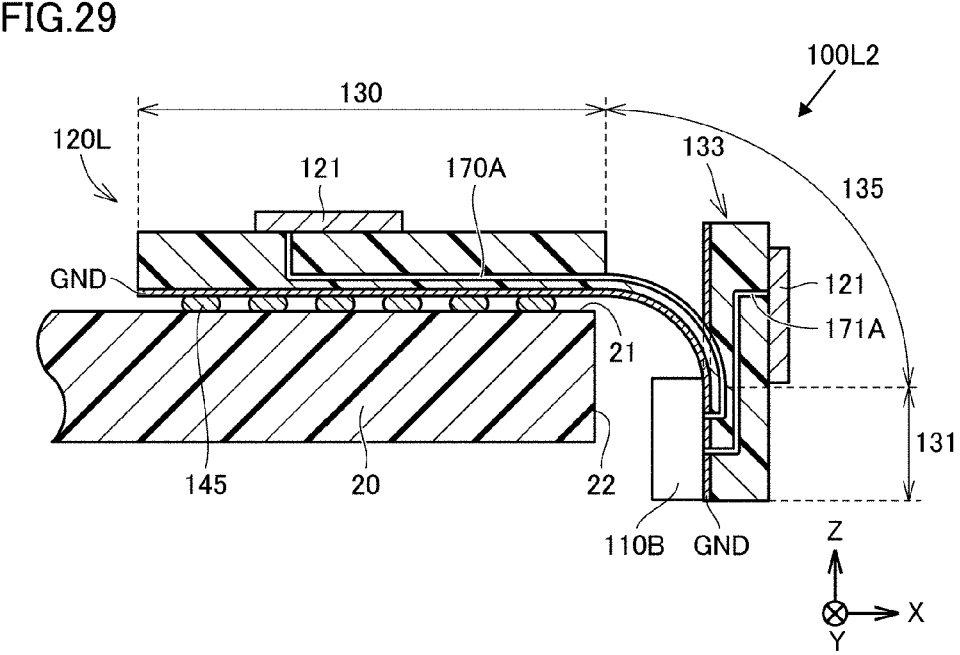
FIG. 29 is a cross-sectional view of a second example of the antenna module according to Embodiment 7.

FIG. 28 is a cross-sectional view of a first example of an antenna module 100L1 according to Embodiment 7. An antenna device 120L of the antenna module 100L1 is directly connected to the mounting substrate 20 with solder bumps 145 interposed therebetween. In the antenna module 100L1, an RFIC 110A is disposed on an inner surface of the flat portion 131 of the dielectric substrate 105 (that is, on a surface facing the mounting substrate 20). In the antenna module 100L1, at least a part of the RFIC 110A is disposed on the protruding portion 133 protruding from the flat portion 131. Note that the RFIC is not necessarily disposed on the protruding portion 133, and may be disposed on a portion other than the protruding portion 133 in the flat portion 131, as in an RFIC 110B of an antenna module 100L2 illustrated in FIG. 29.

The power supply element 121 on the flat portion 130 side is supplied with a radio frequency signal from the RFIC 110A (or the RFIC 110B) through a power supply wiring 170A. Further, the power supply element 121 on the flat portion 131 side is supplied with a radio frequency signal through a power supply wiring 171A. Note that, although not illustrated in the figures, a signal is transmitted from the mounting substrate 20 to the RFIC 110A, or 110B via the bent portion 135

As described above, since the RFIC is disposed on the flat portion 131 side of the dielectric substrate, it is possible to reduce a thickness of the antenna module in a case where a dimension in a thickness direction (Z-axis direction) of a device that houses the antenna module is limited.

Embodiment 8

In the above-described embodiments, the configuration in which at least a part of the power supply element 121 disposed on the flat portion 131 side is disposed on the protruding portion 133 of the flat portion 131 has been described.

Figure 30:
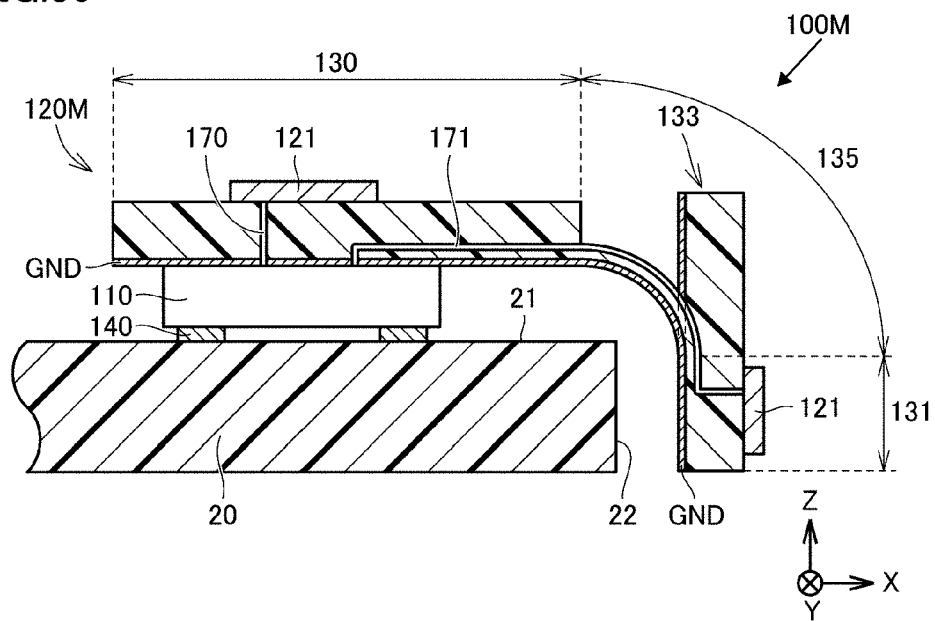
FIG. 30 is a cross-sectional view of an antenna module according to Embodiment 8.

FIG. 30 is a cross-sectional view of an antenna module 100M according to Embodiment 8. In an antenna device 120M in the antenna module 100M, the power supply element 121 disposed on the flat portion 131 side is disposed at a position other than the protruding portion 133 in the flat portion 131.

In the configuration in which the protruding portion is not formed as illustrated in FIG. 5, since the ground electrode GND is bent, radiation directions of radio waves from the power supply element 121 at the connection portion between the flat portion 131 # and the bent portion 135 # are inclined toward the positive direction of the Z-axis rather than the positive direction of the X-axis, and antenna characteristics may be deteriorated. On the other hand, by forming the protruding portion 133 as in the antenna module 100M in FIG. 30, it is possible to secure flatness of the ground electrode GND in a portion where the power supply element 121 is disposed, and thus it is possible to make radiation directions of radio waves from the power supply element 121 closer to the positive direction of the X-axis. This makes it possible to improve a gain in the positive direction of the X-axis, and thus it is possible to suppress a decrease in antenna characteristics.

Embodiment 9

In the above-described embodiments, the configuration has been described in which the antenna device is formed by bending the dielectric substrate itself on which the radiation elements are disposed. In Embodiment 9, description will be given of a configuration in which substrates on which radiation elements are disposed are separately mounted on a substrate in which a bent portion is formed to form an antenna device.

Figure 31:
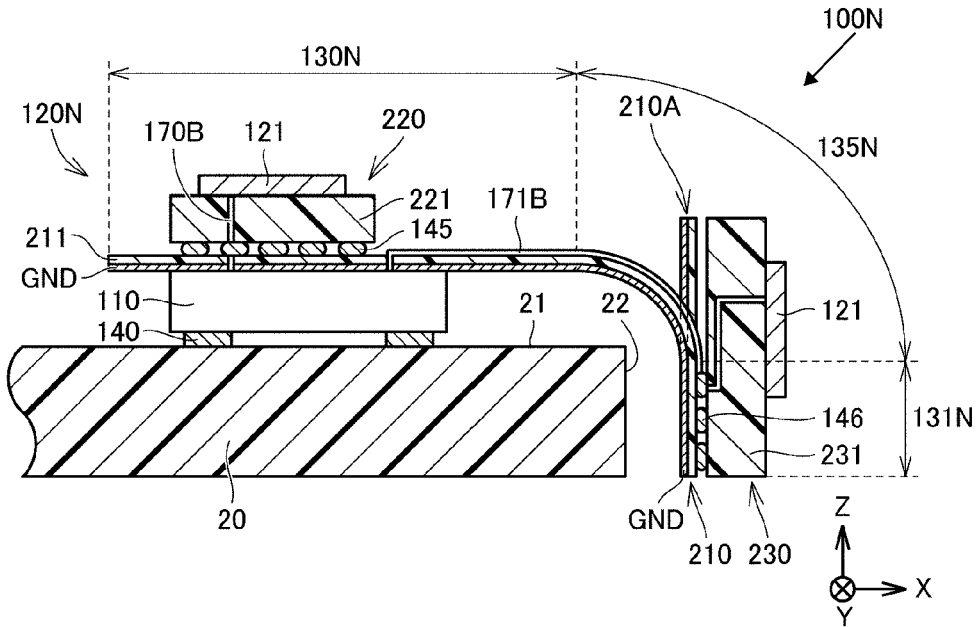
FIG. 31 is a cross-sectional view of an antenna module according to Embodiment 9.

FIG. 31 is a cross-sectional view of an antenna module 100N according to Embodiment 9. An antenna device 120N in the antenna module 100N includes a base substrate 210, a first antenna substrate 220, and a second antenna substrate 230.

The base substrate 210 includes a dielectric 211 and the ground electrode GND. The base substrate 210 has a substantially L-shaped cross-sectional shape, and includes a flat portion 130N having a flat plate shape with the Z-axis direction being as a normal direction, a flat portion 131N having a flat plate shape with the X-axis direction being as a normal direction, and a bent portion 135N connecting the flat portion 130N and the flat portion 131N.

Similarly to the dielectric substrate 105 described in FIG. 2 of Embodiment 1, the flat portion 131N is formed with a protruding portion 210A protruding in the Z-axis direction from a boundary portion between the flat portion 131N and the bent portion 135N. The ground electrode GND is also formed in the protruding portion 210A. The RFIC 110 is connected to a lower surface side (surface in the negative direction of the Z-axis) of the flat portion 130N. The RFIC 110 is mounted on the surface 21 of the mounting substrate 20 with the solder bumps 140 interposed therebetween.

The first antenna substrate 220 is mounted on the flat portion 130N with solder bumps 145 interposed therebetween. Further, the second antenna substrate 230 is mounted on the flat portion 131N with solder bumps 146 interposed therebetween.

In the first antenna substrate 220, the power supply element 121 is disposed on a dielectric 221 having a flat plate shape. The power supply element 121 on the first antenna substrate 220 is supplied with radio frequency signals from the RFIC 110 through the power supply wiring 170B, thereby radiating radio waves in the Z-axis direction. The power supply wiring 170B penetrates the flat portion 130N of the base substrate 210 from the RFIC 110, passes through the solder bumps 145, and penetrates the dielectric 221 to reach the power supply element 121 on the first antenna substrate 220.

In the second antenna substrate 230, the power supply element 121 is disposed on a dielectric 231 having a flat plate shape. The power supply element 121 of the second antenna substrate 230 is supplied with radio frequency signals from the RFIC 110 through a power supply wiring 171B, and thereby radiates radio waves in the X-axis direction. The power supply wiring 171B extends from the RFIC 110 into insides of the flat portion 130N and the bent portion 135N of the base substrate 210 or to surfaces thereof, and reaches the flat portion 131N. Further, the power supply wiring 171B passes through the solder bumps 146 and penetrates the dielectric 231 to reach the power supply element 121 on the second antenna substrate 230. At least a part of the power supply element 121 on the second antenna substrate 230 is disposed at a position facing the protruding portion 210A of the base substrate 210.

As described above, even in the antenna module having the configuration in which the base substrate 210 having the bent portion 135N, and the first antenna substrate 220 and the second antenna substrate 230 on each of which the power supply element 121 is disposed are separately formed, by adopting a structure in which the flat portion 131N protrudes in a direction toward the flat portion 130N with respect to the bent portion 135N, the power supply element 121 can be disposed in the region (the region AR1 in FIG. 5) in an inner side portion of the corner portion of the housing. This makes it possible to reduce a dimension in the Z-axis direction of the entire antenna module while maintaining a size of the power supply element 121, and thus it is possible to provide the miniaturized antenna module that can be disposed in a limited space in a communication device while suppressing a reduction in antenna characteristics.

Embodiment 10

In Embodiment 10, a configuration for securing a protruding amount of the protruding portion in the flat portion 131 facing a side surface of a housing will be described.

Figure 32:
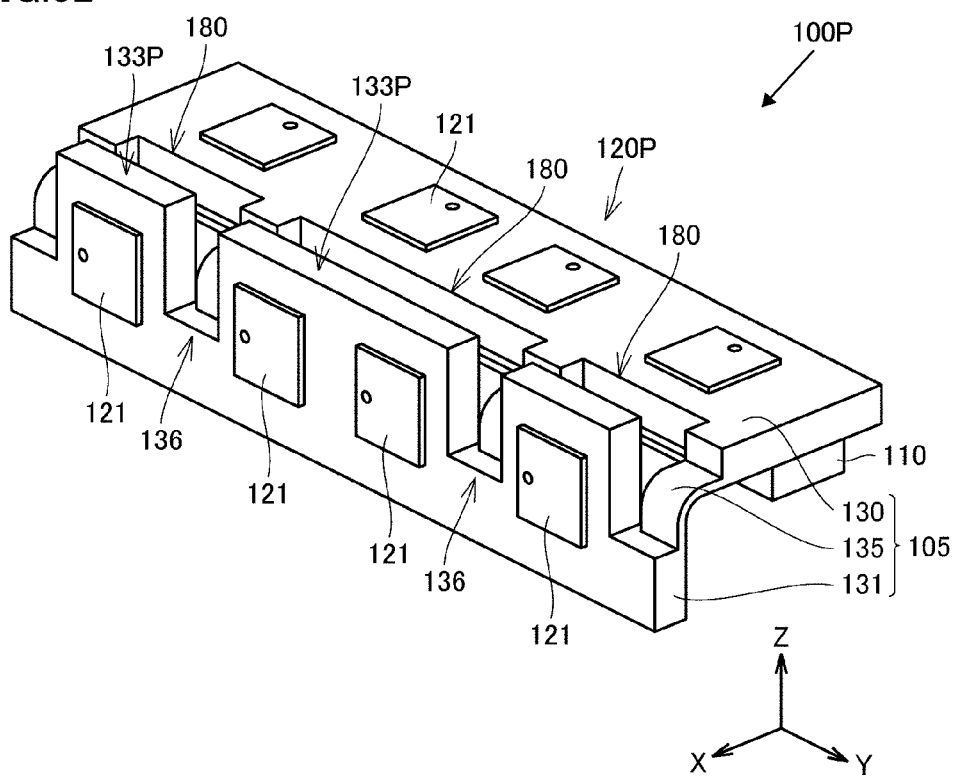
FIG. 32 is a perspective view of an antenna module according to Embodiment 10.
Figure 33:
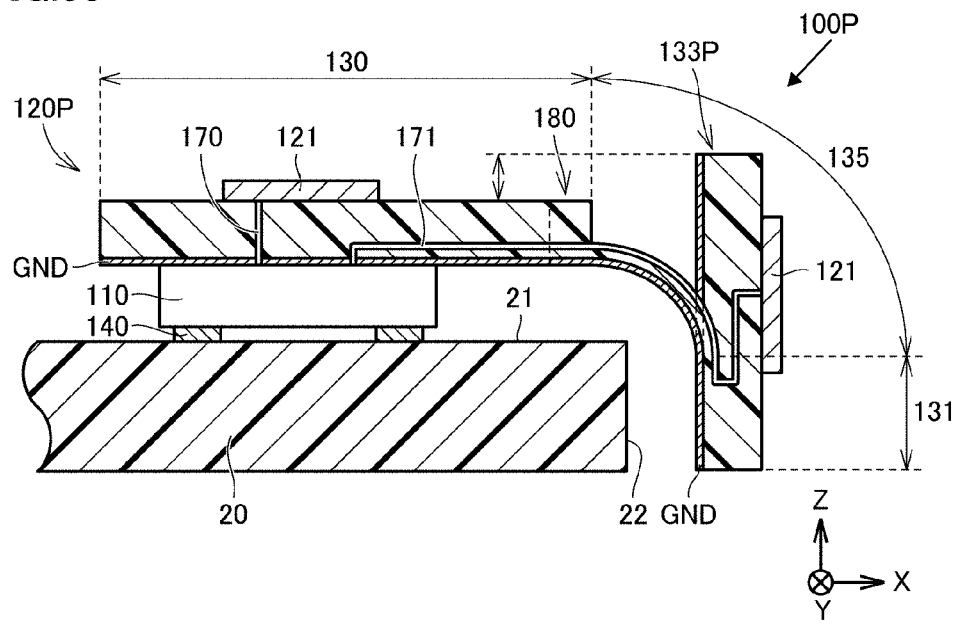
FIG. 33 is a cross-sectional view of the antenna module in FIG. 32.

FIG. 32 is a perspective view of an antenna module 100P according to Embodiment 10. Further, FIG. 33 is a cross-sectional view of the antenna module 100P. The antenna module 100P has a configuration in which the antenna module 100A according to Modification 1 illustrated in FIG. 12 is further modified. Specifically, in an antenna device 120P of the antenna module 100P, cutout portions 180 are formed at an end portion of the flat portion 130 of the dielectric substrate 105, and a dimension (a length in the Z-axis direction) of each of protruding portions 133P of the flat portion 131 corresponding to the cutout portions 180 is longer than that in the case of Modification 1.

In other words, in a case of the antenna module 100P, in the process illustrated in FIG. 7B of the manufacturing process described with reference to FIGS. 7A-7D, a part of the slit 150 is formed so as to extend to a region of the flat portion 130. As a result, it is possible to secure the protruding amount of the protruding portion 133P of the flat portion 131, and as illustrated in FIG. 33, it is possible to make a tip end of the protruding portion 133P higher than an upper surface of the dielectric of the flat portion 130.

Figure 34:
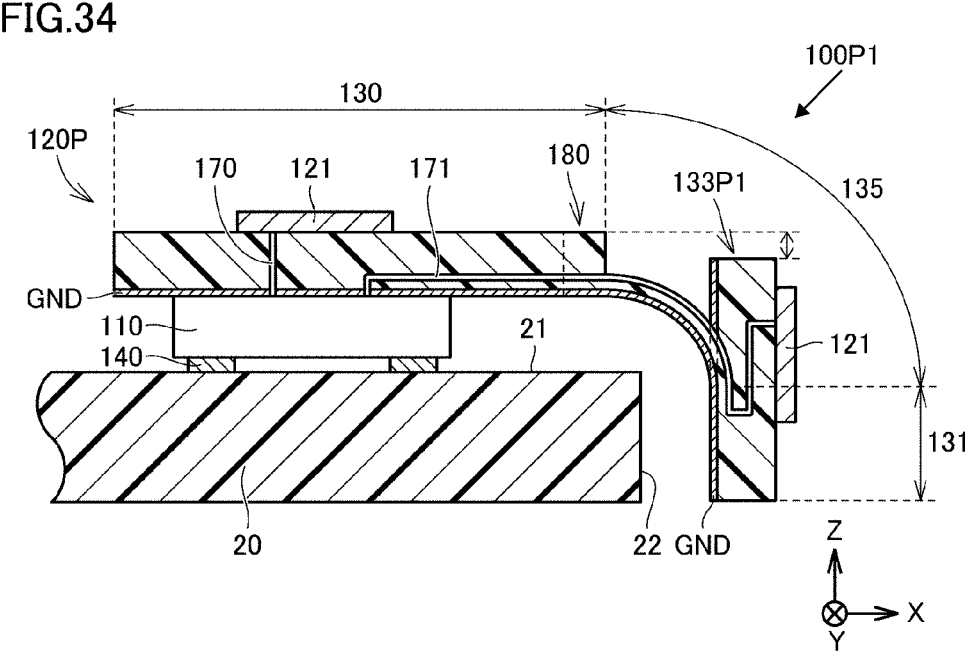
FIG. 34 is a cross-sectional view of a first modification of the antenna module in FIG. 32.
Figure 35:
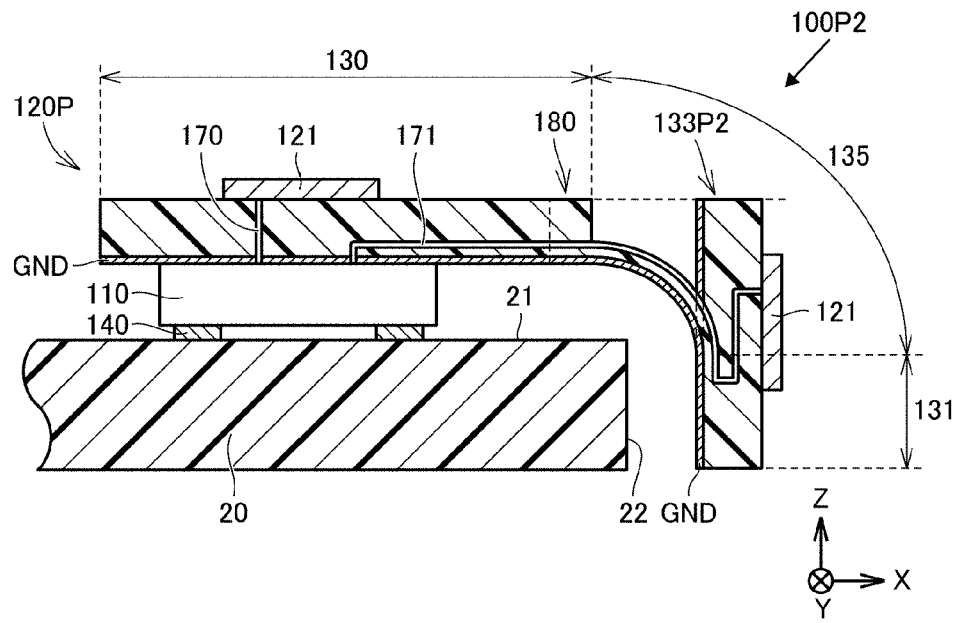
FIG. 35 is a cross-sectional view of a second modification of the antenna module in FIG. 32.

Note that the tip end of the protruding portion is not necessarily positioned above the flat portion 130. That is, as in an antenna module 100P1 in FIG. 34, a tip end of a protruding portion 133P1 may be positioned lower than an upper surface of the flat portion 130, or a tip end of a protruding portion 133P2 may be aligned with the upper surface of the flat portion 130 as in an antenna module 100P2 of FIG. 35.

Embodiment 11

In Embodiment 11, a configuration in which a shape of a connection portion between the flat portion 130 and the bent portion 135 is made a circular arc shape to suppress a reduction in flexibility will be described.

Figure 36:
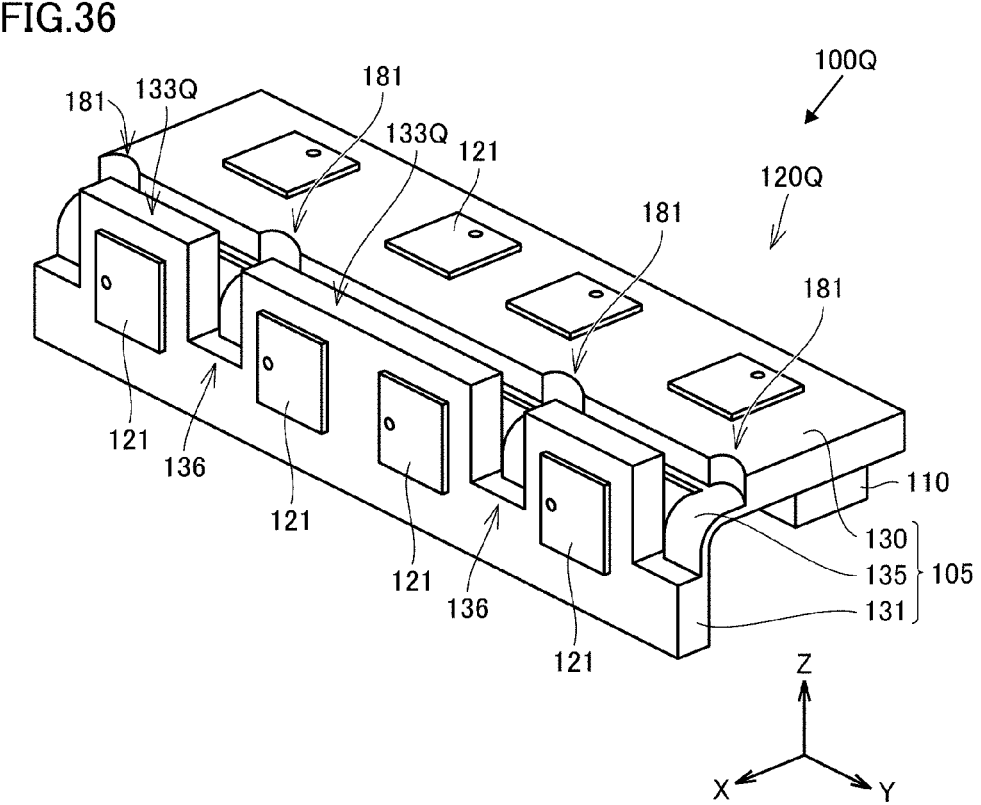
FIG. 36 is a perspective view of an antenna module according to Embodiment 11.

FIG. 36 is a perspective view of an antenna module 100Q according to Embodiment 11. In the antenna module 100Q, a connection portion between the flat portion 130 and the bent portion 135 in the flat portion 130 of the antenna module having a substantially L-shape is cut in a circular arc shape to form a concave portion 181.

In the manufacturing process described with reference to FIGS. 7A-7D, when the bent portion 135 is formed by reducing the thickness of the dielectric, or when the laser processing for forming the slits 150 is performed, a part that is not processed may remain on the side of the bent portion 135 due to a factor, such as a positional shift, and the dielectric may be thicker than a desired thickness. When such a part that is not processed remains, flexibility of the part decreases, and there is a possibility that the power supply wiring is disconnected due to stress concentration that occurs due to the decrease in flexibility.

In the antenna module 100Q, by forming the concave portions 181 having a circular arc shape in the connection portion between the flat portion 130 and the bent portion 135, it is possible to suppress the occurrence of the part that is not processed on the side of the bent portion 135. This makes it possible to suppress a decrease in flexibility of the bent portion 135, and thus it is possible to suppress the disconnection of the power supply wiring at the boundary portion between the flat portion 130 and the bent portion 135.

Embodiment 12

In Embodiment 12, a configuration in which an end surface of each flat portion of the dielectric substrate 105 has a tapered shape will be described.

As described in the manufacturing method of the antenna module in FIGS. 7A-7D, when the flat portion 130 and the flat portion 131 of the dielectric substrate 105 are formed, laser processing may be used in some cases. When an opening portion is formed from an upper surface toward a lower surface of a substrate by using the laser processing, a dielectric is removed by using the laser processing also in a peripheral portion of a desired opening position in order to reliably form the opening portion on the upper surface side, but as for on the lower surface side, the processing is ended at the time when the opening portion penetrates the lower surface, so as a result, a size of the opening portion on the upper surface side tends to be larger than a size of the opening portion on the lower surface side. That is, an end surface from which the dielectric is removed does not have a right angle with respect to a main surface of the dielectric substrate, and may have a tapered shape in many cases. More specifically, a removal width of the surface of the dielectric substrate on the side close to an irradiation source of the laser tends to be wider than a removal width of the surface on the side farther from the irradiation source. Therefore, the tapered shape of the end surface is different between a case where the laser is irradiated from the front surface side of the dielectric substrate and a case where the laser is irradiated from the rear surface side of the dielectric substrate.

Figure 37:
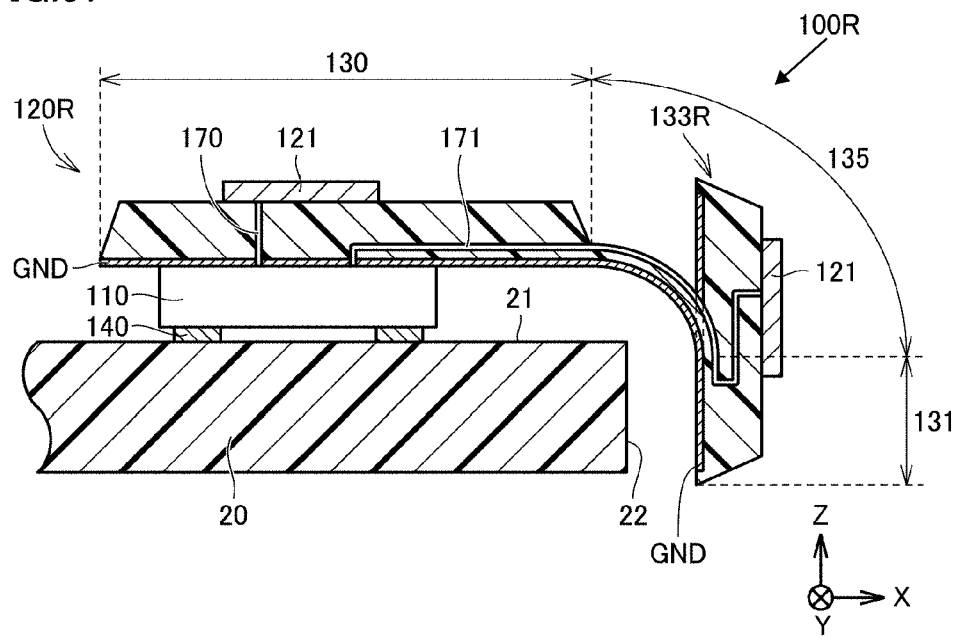
FIG. 37 is a cross-sectional view of a first example of an antenna module according to Embodiment 12.

FIG. 37 is a cross-sectional view of a first example of an antenna module 100R according to Embodiment 12. The antenna module 100R is an example of the case where the laser is irradiated from the side of the front surface (that is, a surface on which the power supply element 121 is disposed) when the dielectric substrate 105 is formed. Therefore, in the antenna module 100R, a dimension of the surface on which the power supply element 121 is disposed is narrower than a dimension of the surface on which the ground electrode GND is disposed.

When the end surface of the flat portion of the dielectric substrate 105 has a tapered shape as illustrated in FIG. 37, some of electric lines of force from the power supply element 121 to the ground electrode GND pass through the air outside the dielectric substrate 105, and therefore an effective dielectric constant between the power supply element 121 and the ground electrode GND decreases. Accordingly, it is possible to improve antenna characteristics.

Figure 38:
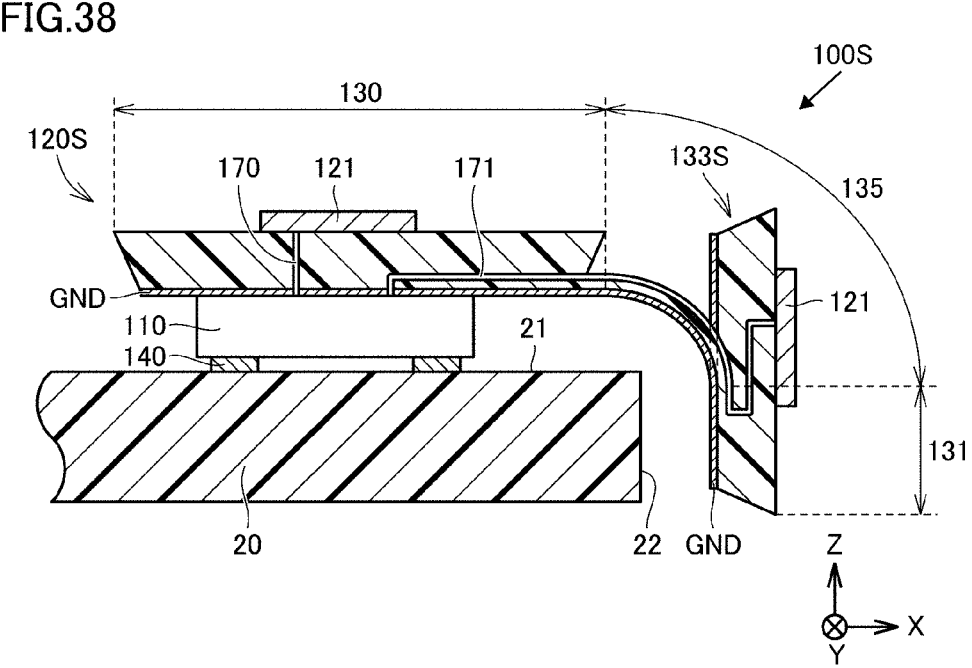
FIG. 38 is a cross-sectional view of a second example of the antenna module according to Embodiment 12.

On the other hand, an antenna module 100S of a second example illustrated in FIG. 38 is an example of the case where the laser is irradiated from the side of the rear surface (that is, the surface on which the ground electrode GND is disposed) when the dielectric substrate 105 is formed. Therefore, in the antenna module 100S, a dimension of the surface on which the power supply element 121 is disposed is larger than a dimension of the surface on which the ground electrode GND is disposed.

In the case of the second example in FIG. 38, when the bent portion 135 is bent, it is possible to prevent a protruding portion 133S and the flat portion 130 from being brought into contact with each other.

Embodiment 13

In each of the above-described embodiments, description has been given of a configuration in which, in the dielectric substrate, the flat portion 131 connected through the bent portion from the flat portion 130 that is one flat portion of the dielectric substrate is bent from the flat portion 130 toward the mounting substrate 20 side. In Embodiment 13, a configuration in which the bent portion is bent from the flat portion 130 to the side opposite to the mounting substrate 20 will be described.

Figure 39:
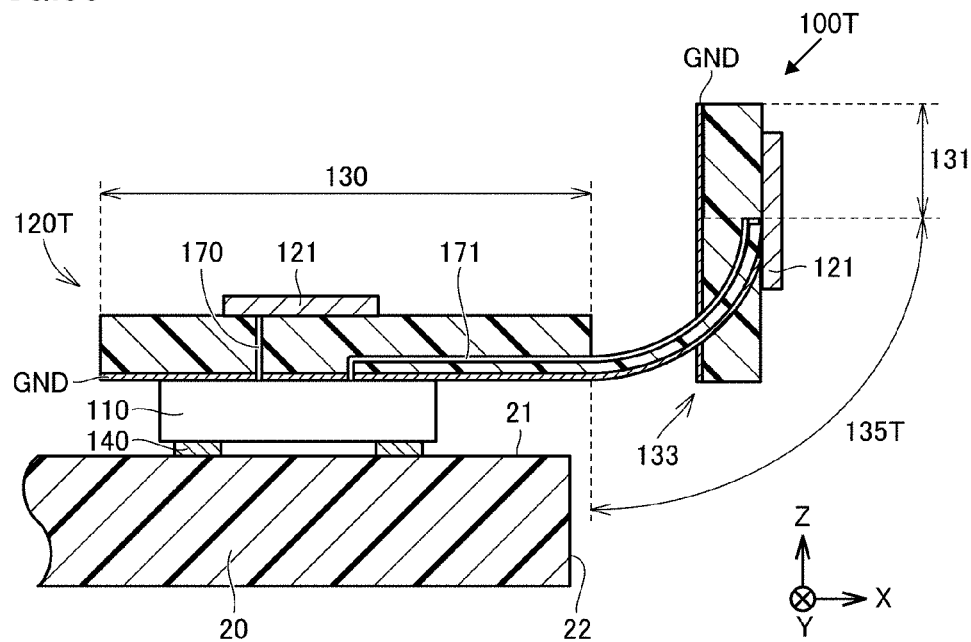
FIG. 39 is a cross-sectional view of a first example of an antenna module according to Embodiment 13.

FIG. 39 is a cross-sectional view of an antenna module 100T according to Embodiment 13. The antenna module 100T has a configuration in which a bent portion 135T is bent in the positive direction of the Z-axis from the flat portion 130, and the flat portion 131 is connected to the bent portion 135T. That is, the flat portion 131 has a shape protruding in the positive direction of the Z-axis direction with respect to the flat portion 130. Then, the protruding portion 133 is formed in the negative direction of the Z-axis from a connection portion between the bent portion 135T and the flat portion 131. In such a configuration, when there is a margin in a space on an upper side (the positive direction of the Z axis) of the flat portion 130, it is possible to dispose the power supply element 121 in a region of a corner portion of a housing.

Figure 40:
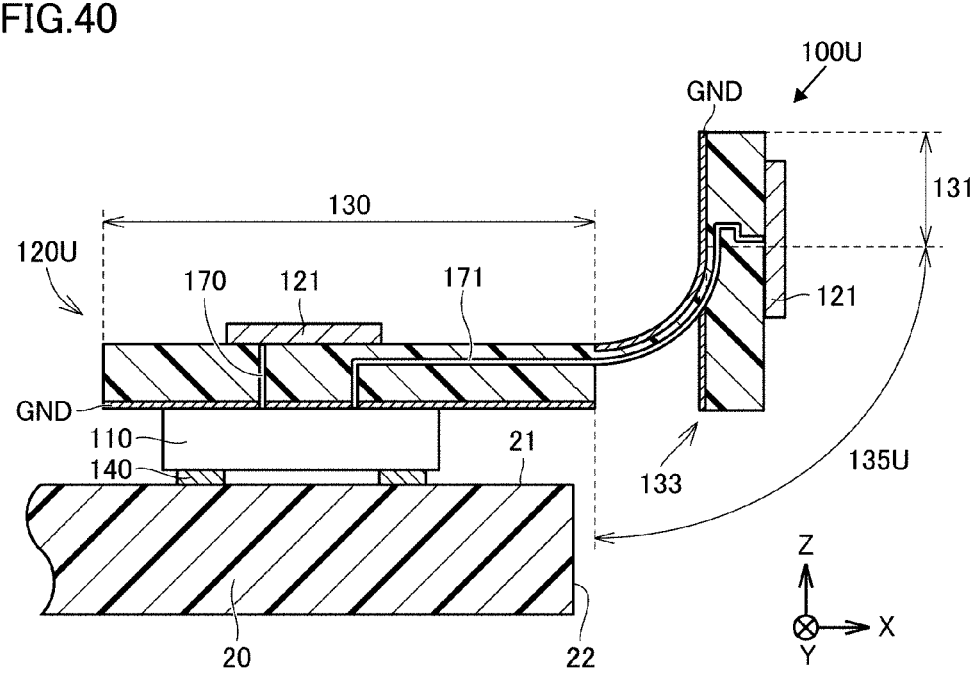
FIG. 40 is a cross-sectional view of a second example of the antenna module according to Embodiment 13.

Note that, as illustrated in an antenna module 100U in FIG. 40, a configuration may be applicable in which in a case where a bent portion 135U is formed on the side of a surface of the flat portion 130 on which the power supply element is disposed, the bent portion 135U is bent to the side opposite to the mounting substrate 20.

Embodiment 14

In the above-described embodiments, a case where a bending angle of the bent portion is 90° has been described, but the bending angle may be larger than 90°.

Figure 41:
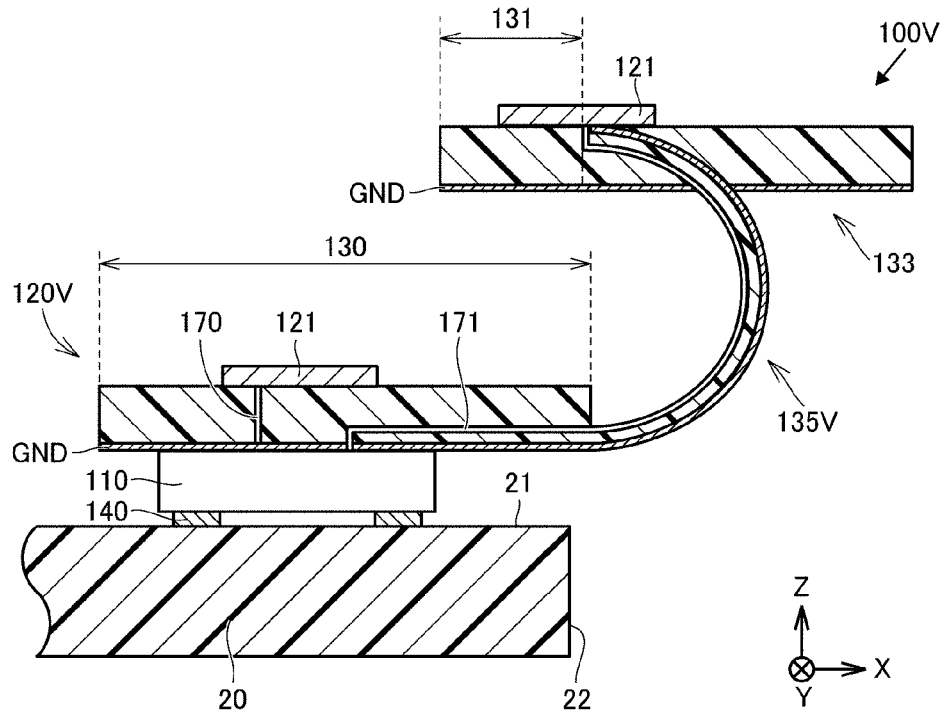
FIG. 41 is a cross-sectional view of a first example of an antenna module according to Embodiment 14.

For example, as in an antenna module 100V in FIG. 41, a bent portion 135V may be bent by about 180° (e.g., 90° or more and 185° or less) in the positive direction of the Z-axis from the flat portion 130. Alternatively, as in an antenna module 100W in FIG. 42, a bent portion 135W may be bent by about 180° (e.g., 90° or more and 185° or less) in the negative direction of the Z-axis from the flat portion 130.

Also, in such a configuration, it is possible to effectively utilize a limited space in a housing.

Figure 42:
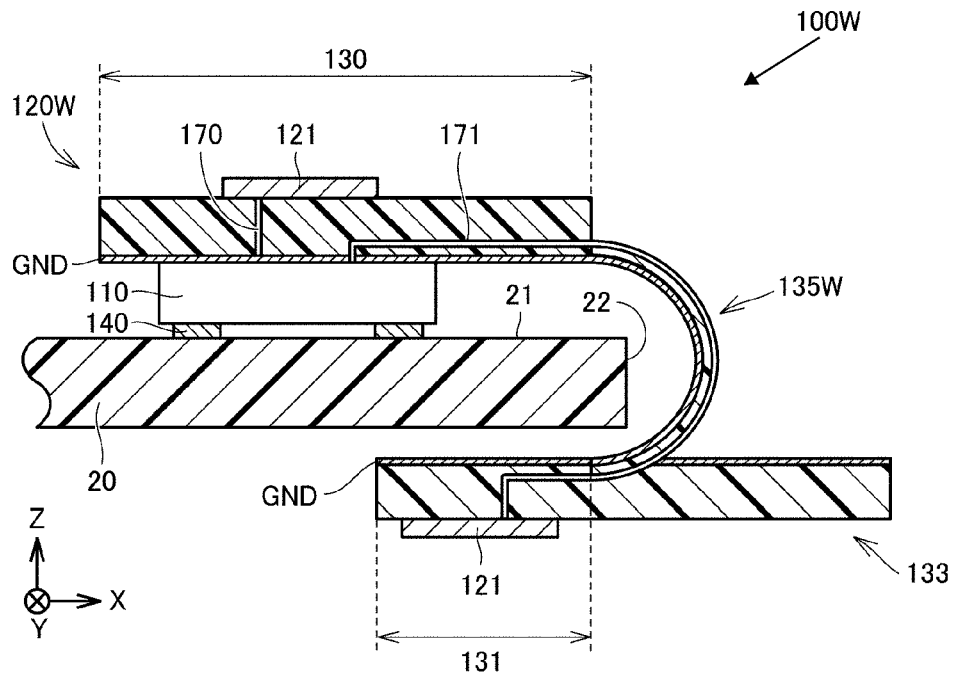
FIG. 42 is a cross-sectional view of a second example of the antenna module according to Embodiment 14.

Note that, in FIG. 41 and FIG. 42, the case where the bent portion is bent by about 180° (e.g., 90° or more and 185° or less) has been described as an example, but the bending angle of the bent portion can be appropriately selected within a range equal to or larger than 90° and equal to or smaller than 180°.

Embodiment 15

In each antenna module of the above-described embodiments, the configuration has been described in which radio waves are radiated in the X-axis direction and/or the Y-axis direction in addition to a direction perpendicular to the surface of the mounting substrate (that is, the Z-axis direction). In Embodiment 15, a configuration in which radio waves are radiated in two directions that are the X-axis direction and the Y-axis direction will be described.

Figure 43:
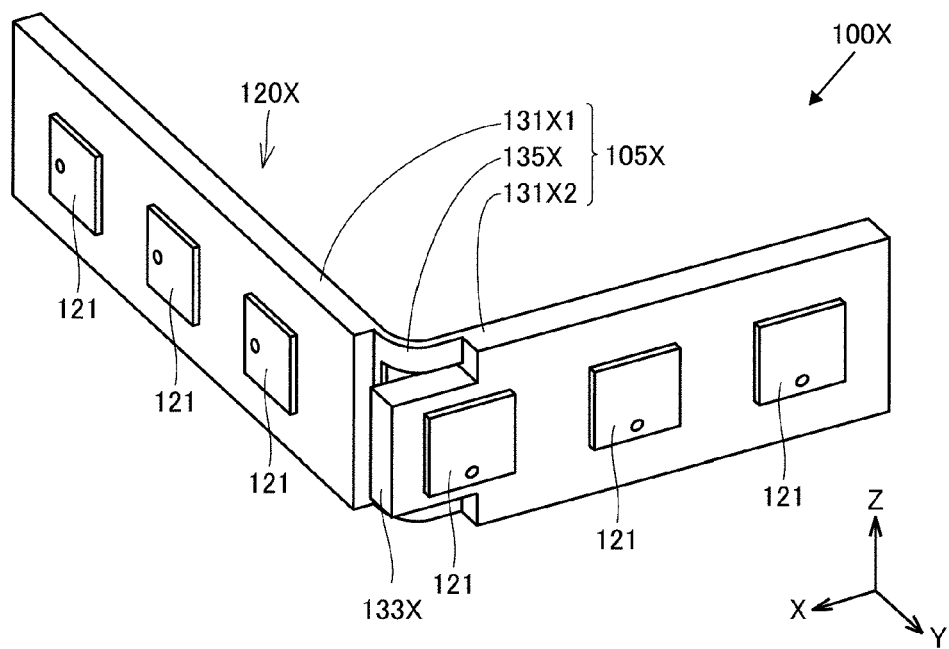
FIG. 43 is a perspective view of an antenna module according to Embodiment 15.

FIG. 43 is a perspective view of an antenna device 120X of an antenna module 100X according to Embodiment 15. In the antenna device 120X, a dielectric substrate 105X includes a flat portion 131X1 with the X-axis direction being as a normal direction, a flat portion 131X2 with the Y-axis direction being as a normal direction, and a bent portion 135X. The flat portion 131X2 is connected to the flat portion 131X1 by the bent portion 135X. A protruding portion 133X is formed in the positive direction of the X-axis from a connection portion between the flat portion 131X2 and the bent portion 135X. Such an antenna device 120X is, for example, disposed at a corner portion of a side surface of the mounting substrate.

A plurality of power supply elements 121 is arranged in each of the flat portions 131X1 and 131X2. Therefore, radio waves are radiated from the antenna module 100X in two directions that are the positive direction of the X-axis and the positive direction of the Y-axis. In addition, on the flat portion 131X2, at least a part of the power supply element 121 disposed at a position closest to the flat portion 131X1 is disposed so as to overlap with the protruding portion 133X. With such a configuration, it is possible to utilize a space of a corner portion formed by adjacent side surfaces of a housing.

Note that, in the above-described embodiments, the configuration in which the radiation elements are disposed on the flat portion has been described, but, in addition to these, other radiation elements may be formed on a front surface and/or a rear surface of the bent portion. In this case, not only a patch antenna having a flat plate shape, but also a linear antenna, such as a monopole antenna and a dipole antenna may be formed as the radiation element. Furthermore, the features of each of the above-described embodiments can be combined as appropriate within a range in which no contradiction occurs.

It should be considered that the embodiments disclosed herein are illustrative in all respects and are not restrictive. The scope of the present disclosure is indicated by the claims rather than the description of the above-described embodiments, and it is intended to include all modifications within the meaning and scope equivalent to the claims.

REFERENCE SIGNS LIST

10 COMMUNICATION DEVICE
20 MOUNTING SUBSTRATE

21 SURFACE
22 SIDE SURFACE
30 HOUSING
100, 100A TO 100N, 100P TO 100X ANTENNA MODULE
105, 105X DIELECTRIC SUBSTRATE
110, 110A, 110B RFIC
111A to 111D, 113A TO 113D, 117 SWITCH
112AR TO 112DR LOW-NOISE AMPLIFIER
112AT TO 112DT POWER AMPLIFIER
114A TO 114D ATTENUATOR
115A TO 115D PHASE SHIFTER
116 SIGNAL MULTIPLEXER/DEMULTIPLEXER
118 MIXER
119 AMPLIFICATION CIRCUIT
120, 120A TO 120N, 120P TO 120X ANTENNA DEVICE
121 POWER SUPPLY ELEMENT
122 PARASITIC ELEMENT
130, 130N, 131, 131A, 131J, 131N, 131X FLAT PORTION
133, 133A TO 133G, 133J, 133P TO 133S, 133X, 210A PROTRUDING PORTION
134, 134A BOUNDARY PORTION
135, 135A TO 135C, 135J, 135N, 135T TO 135X BENT PORTION
136, 137, 180 CUTOUT PORTION
140, 145, 146 SOLDER BUMP
150, 150A, 150B SLIT
152, 181, 195 CONCAVE PORTION
155 CORNER PORTION
170, 170A, 170B, 171, 171A, 171B POWER SUPPLY WIRING
190 ELECTRODE
200 BBIC
210 BASE SUBSTRATE
220, 230 ANTENNA SUBSTRATE
211, 221, 231 DIELECTRIC
ED1, ED2 END POINT
GND GROUND ELECTRODE
SP, SP1, SP2 POWER SUPPLY POINT
ST, ST1, ST2 START POINT

The invention claimed is:

1. An antenna module comprising:
a dielectric substrate; and
a first radiation element on the dielectric substrate, wherein
the dielectric substrate includes
a first flat portion and a second flat portion, and
a first bent portion connecting the first flat portion and the second flat portion,
the first flat portion has a first protruding portion partially protruding toward the second flat portion,
the first bent portion is provided at a position where the first protruding portion is not provided in the first flat portion, and
at least a part of the first radiation element is on the first protruding portion.

2. The antenna module according to claim 1, wherein the first flat portion and the second flat portion have mutually different normal directions.

3. The antenna module according to claim 1, wherein the first protruding portion partially protrudes toward the second flat portion along the first flat portion from a boundary portion between the first bent portion and the first flat portion.

4. The antenna module according to claim 1, wherein the first flat portion and the first bent portion are connected to each other at the position where the first protruding portion is not provided in the first flat portion.

5. The antenna module according to claim 3, wherein the second flat portion includes
a first surface, and
a second surface positioned opposite to the first surface and closer to the first flat portion than the first surface, and
the first protruding portion extends from the boundary portion between the first bent portion and the first flat portion to a position exceeding the second surface.

6. The antenna module according to claim 1, wherein a thickness of the first bent portion is smaller than a thickness of the first flat portion.

7. The antenna module according to claim 1, wherein a thickness of the first flat portion is equal to a thickness of the second flat portion.

8. The antenna module according to claim 3, further comprising:
a power supply wiring configured to transmit a radio frequency signal to the first radiation element, wherein
the power supply wiring is connected to a power supply point of the first radiation element, and
the boundary portion between the first bent portion and the first flat portion is positioned in a direction toward the first protruding portion with respect to the power supply point.

9. The antenna module according to claim 3, further comprising:
a second radiation element on the first flat portion.

10. The antenna module according to claim 9, wherein the first flat portion further includes
a second protruding portion partially protruding in a direction toward the second flat portion along the first flat portion from the boundary portion between the first bent portion and the first flat portion, and
at least a part of the second radiation element is on the second protruding portion.

11. The antenna module according to claim 9, wherein the first radiation element and the second radiation element are on the first protruding portion.

12. The antenna module according to claim 1, further comprising:
a third radiation element on the second flat portion.

13. The antenna module according to claim 12, wherein the second flat portion includes
a third protruding portion partially protruding in a direction toward the first flat portion along the second flat portion from a boundary portion between the first bent portion and the second flat portion,
the second flat portion and the first bent portion are connected to each other at a position where the third protruding portion is not provided in the second flat portion, and
at least a part of the third radiation element is on the third protruding portion.

14. The antenna module according to claim 2, wherein the dielectric substrate further includes
a third flat portion having a normal direction different from the normal directions of the first flat portion and the second flat portion, and
a second bent portion connecting the second flat portion and the third flat portion,
the third flat portion includes a fourth protruding portion partially protruding in a direction toward the second flat portion along the third flat portion from a boundary portion between the second bent portion and the third flat portion, and the third flat portion and the second bent portion are connected to each other at a position where the fourth protruding portion is not provided in the third flat portion, the antenna module further comprising:

a fourth radiation element on the third flat portion.

15. The antenna module according to claim 1, further comprising:
a power supply circuit configured to supply a radio frequency signal to each radiation element.

16. A communication device comprising:
the antenna module according to claim 1.

17. An antenna module comprising:
a dielectric substrate; and
a radiation element on the dielectric substrate, wherein the dielectric substrate includes
a first flat portion and a second flat portion, and
a first bent portion connecting the first flat portion and the second flat portion,
the first flat portion has a first protruding portion partially protruding toward the second flat portion,
the first bent portion is arranged at a position where the first protruding portion is not provided in the first flat portion, and
the radiation element is at a position other than the first protruding portion in the first flat portion.

18. The antenna module according to claim 17, wherein the first flat portion and the second flat portion have mutually different normal directions.

19. The antenna module according to claim 17, wherein the first protruding portion partially protrudes toward the second flat portion along the first flat portion from a boundary portion between the first bent portion and the first flat portion.

20. The antenna module according to claim 17, further comprising:
a power supply circuit configured to supply a radio frequency signal to each radiation element.

* * * * *